United States Patent [19]
Graham et al.

[11] Patent Number: 5,914,709
[45] Date of Patent: Jun. 22, 1999

[54] USER INPUT DEVICE FOR A COMPUTER SYSTEM

[75] Inventors: David S. Graham; Daniel A. Francis, both of San Francisco, Calif.

[73] Assignee: Poa Sana, LLC, San Francisco, Calif.

[21] Appl. No.: 08/818,774

[22] Filed: Mar. 14, 1997

[51] Int. Cl.[6] .................................................. G09G 5/00
[52] U.S. Cl. ......................... 345/179; 345/175; 345/176; 345/173
[58] Field of Search ................................... 345/175, 179, 345/104, 173, 176

[56] References Cited

U.S. PATENT DOCUMENTS

| | | | |
|---|---|---|---|
| 4,240,849 | 12/1980 | Kurokawa et al. | 156/73.2 |
| 4,695,827 | 9/1987 | Beining et al. | 345/175 |
| 4,868,912 | 9/1989 | Doering | 340/706 |
| 4,891,508 | 1/1990 | Campbell | 250/221 |
| 4,936,683 | 6/1990 | Purcell | 356/152 |
| 5,162,783 | 11/1992 | Moreno | 340/712 |
| 5,170,448 | 12/1992 | Ackley et al. | 385/31 |
| 5,196,836 | 3/1993 | Williams | 345/175 |
| 5,414,413 | 5/1995 | Tamaru et al. | 345/175 |
| 5,418,871 | 5/1995 | Revelli, Jr. et al. | 385/44 |
| 5,546,492 | 8/1996 | Ansley et al. | 385/116 |

FOREIGN PATENT DOCUMENTS 63-076012  6/1988  Japan .

OTHER PUBLICATIONS

L.A. Jansen and D.R. Thompson, Finger Pointdetection Using Gas Panel, IBM Technical Disclosure Bulletin, vol. 23, No. 7B, Dec. 1980.

Touch–Sensitive Device for Display, IBM Technical Disclosure Bulletin, vol. 30, No. 11, Apr. 1988.

*Primary Examiner*—Jeffery A. Hofsass
*Assistant Examiner*—Julie Lieu
*Attorney, Agent, or Firm*—Beyer & Weaver, LLP

[57] ABSTRACT

A user input device for an electronic device is disclosed. The user input device provides positional information using a grid of light. The grid of light is produced from a light source and waveguides. The grid of light is also received and processed using waveguides and a light detector. Optionally, optics may be used to enhance the operation of the user input device. The user input device is particularly suited for use as a user input device for a computer system or the like.

43 Claims, 18 Drawing Sheets

USER INPUT DEVICE FOR A COMPUTER SYSTEM

BACKGROUND OF THE INVENTION

1. Field of the Invention

The present invention relates to a user input device and, more particularly, to a user input device for a computer system.

2. Description of the Related Art

User input devices for computer systems can take many forms. Two forms of user input devices of interest are touch screens and pen-based screens. Touch screens provide a user's input by way of a user touching a display screen with one's finger. Pen-based screens provide a user's input by way of a user touching a display screen with a stylus or pen.

One conventional approach to providing touch or pen-based screens is to overlay a resistive or capacitive film over the display screen. One problem of the conventional film approach is that the films are easily damaged. Another problem with the conventional film approach is that the cost of this approach tends to be too expensive for standard size or larger display screens because it scales quadratically with perimeter. Another problem of the conventional film approach is that the largely translucent film is laid over the display screen. The film thus causes the display screen to appear dimmed. To compensate, the display screen could offer a greater intensity of light output but such is not always sufficiently available. For example, in the case of portable computers, additional light intensity is usually not available and, if it were, it would lead to additional power consumption that strains the battery of the portable computer.

Another approach to providing touch or pen-based screens is to use banks of infrared Light Emitting Diodes (LEDs) to provide light and a corresponding bank of phototransistors to detect the light. A major problem of the conventional light-based approach is that it requires a large number of components. The components are also too large for use on portable computers. Another problem with the conventional light-based approach is that it is unable to provide the high resolution needed for pen-based screens. Additionally, the conventional light-based approaches are expensive given the large number of components required.

Another approach to providing touch or pen-based screens is to use a bundle of fiber optic cables, a liquid crystal display (LCD) as a controllable mask, and a multiplexing scheme. Such an approach is described in U.S. Pat. No. 5,196,836. Here, although only a single light emitter is used, the spreading of the light output from the fiber optic cables is severe such that controllable LCD masks are needed to sequentially isolate light output from only one fiber optic cable at a time. The reception of the light from an isolated fiber optic cable is also isolated on the reception side. Given this arrangement, the system has to scan through each of the fiber optic cables using the multiplexing scheme which makes the approach very slow. Furthermore, this approach cannot yield high resolution needed for pen-based screens and is also rather expensive to fabricate.

Thus, there is a need for improved user input devices that can provide high resolution at moderate cost.

SUMMARY OF THE INVENTION

Broadly speaking, the invention relates to a user input device for an electronic device that provides positional information using a grid of light. The grid of light is produced and processed using waveguides that direct the transmission and reception of light. Optionally, optics may be used to enhance the operation of the user input device. The user input device is particularly suited for use as a user input device for a computer system or the like.

The invention can be implemented in numerous ways, including as an apparatus, a system, and a method. Several embodiments of the invention are discussed below.

An apparatus according to one embodiment of the invention includes: a light source; a transmission waveguide portion optically coupled to receive light from the light source, the transmission waveguide portion including a plurality of light transmission waveguides that produce a first set of light beams in response to the light received from the light source, and the first set of light beams emanate from the light transmission waveguides in a first direction; a reception waveguide portion spaced apart from the transmission waveguide in the first direction, the reception waveguide portion including a plurality of light reception waveguides for receiving the first set of light beams emanating from the light transmission waveguides; and a light detector optically coupled to the reception waveguide portion to receive the light from the light reception waveguides of the reception waveguide portion, the light detector measures light intensity of the light from the light reception waveguides of the reception waveguide portion. The embodiment may further include lenses optically positioned proximate to the transmission waveguide portion to collimate the first set of light beams emanating from the light transmission waveguides towards the corresponding light reception waveguides of the reception waveguide portion.

As an input device for an electronic device another embodiment of the invention includes: at least one light source; a light detector to detect light intensity at a plurality of light detecting elements; and a lithographically defined waveguide structure including a plurality of waveguides. The light source couples light into a first set of the waveguides of the waveguide structure and the waveguide structure produces a grid of light beams from the light coupling into the waveguides. The grid of light beams traverse an input area and are then directed to the light detector by a second set of the waveguides of the waveguide structure.

As a method for determining a user's input with respect to an input device, an embodiment of the invention includes the operations of: providing a source of light; producing a plurality of parallel light beams from the source of light; simultaneously directing the parallel light beams across an input area of the input device, the input area being positioned with respect to the input device; simultaneously receiving certain of the parallel light beams after having crossed the input area; determining light intensity for each of the parallel light beams received; and determining whether there is a user's input with respect to the input area based on the determined light intensity values.

The advantages of the invention are numerous. One advantage of the invention is that high resolutions are obtainable. Another advantage of the invention is that the cost of the input device is moderate and significantly lower than conventional designs because cost scales linearly with perimeter, thus making the input device especially beneficial for normal and large size display screens. Still another advantage of the invention is that display screen intensity is not hindered. Yet another advantage of the invention is that the input device requires few components which are relatively small, inexpensive, and easily assembled onto two-dimensional surfaces.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to a user input device for an electronic device that provides positional information using a grid of light. The grid of light is produced and processed using waveguides that direct the transmission and reception of light. Optionally, optics may be used to enhance the operation of the user input device. The user input device is particularly suited for use as a user input device for a computer system or the like.

Embodiments of the invention are discussed below with reference to FIGS. 1–12D. However, those skilled in the art will readily appreciate that the detailed description given herein with respect to these figures is for explanatory purposes as the invention extends beyond these limited embodiments.

Figure 1:
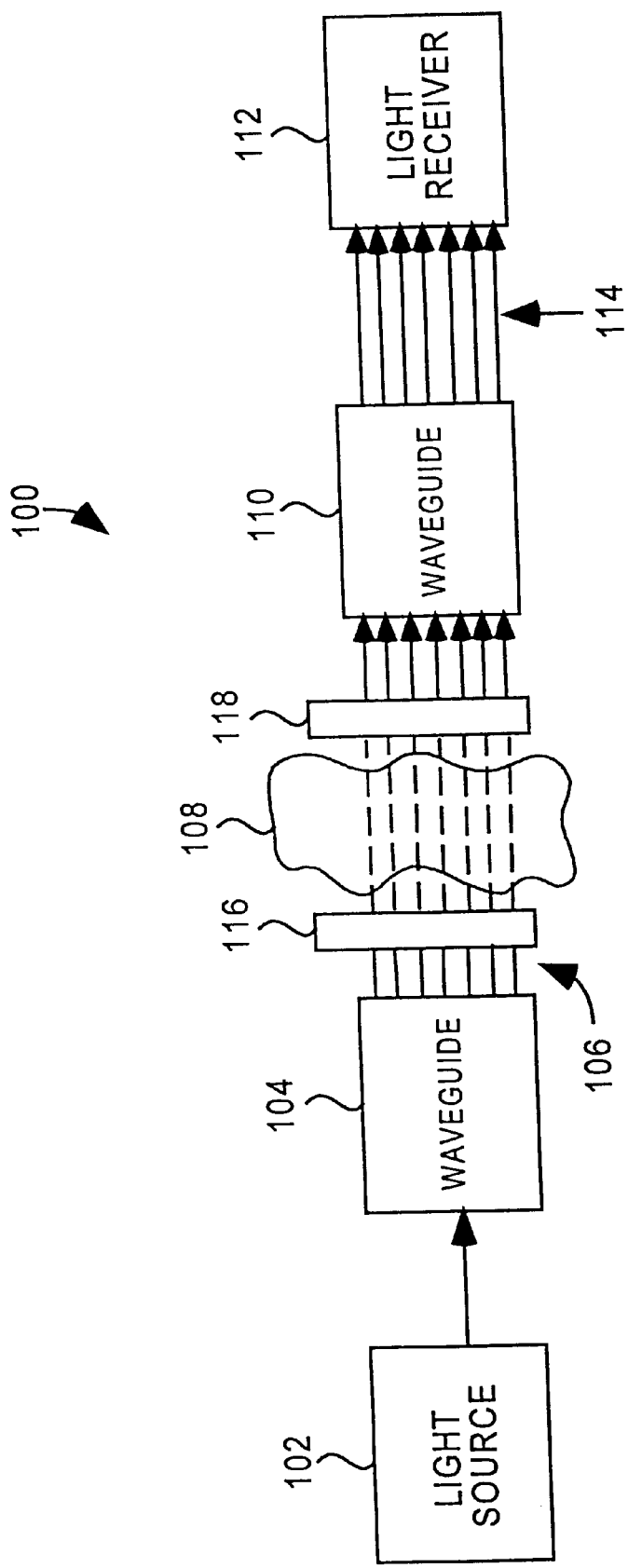
FIG. 1 is a block diagram of an input position detection system according to an embodiment of the invention.

FIG. 1 is a block diagram of an input position detection system 100 according to an embodiment of the invention. The input position detection system 100 includes a light source 102 that directs light to waveguides 104. The waveguides 104 redirect the incoming light into a plurality of light beams 106 that are directed across a transmission media 108 to waveguides 110. The waveguides 110 direct the received light beams 107 to a light receiver 112 as light beams 114. The light receiver 112 then determines whether each of the light beams 114 that the light receiver 112 receives is "on" or "off" based on an intensity level of the received light for each of the light beams 114.

Those of the light beams 106 that are blocked (e.g., by user input) while being directed across the transmission media 108 are identified as "off" light beams by the light receiver 112. A user's finger (touch input) or a stylus (pen-based input) blocks one or more of the light beams 106 from reaching both the waveguides 110 and the light receiver 112. The particular one or more of the light beams 106 being blocked thus provides a position of the user's input with respect to the light beams 106 that preferable have a predetermined relative location with respect to the transmission media 108 (e.g., display screen). Consequently, the one or more light beams 114 that the light receiver 112 determines to be "off" indicates the position of the user's input.

Optionally, the input position detection system 100 may include lenses 116 (e.g., polymer microlens arrays) at the transmit side, i.e., proximate to the output of the waveguide 104. Preferably, the lenses 116 are collimating lens that direct the light beams 106 across the transmission media 108 towards the respective waveguides 110. The input position detection system 100 may also include lenses 118 at the receive side (i.e., proximate to the input of the waveguide 110). The lenses 118 direct the light beams being directed across the transmission media 108 into the respective waveguides 110.

Figure 2:
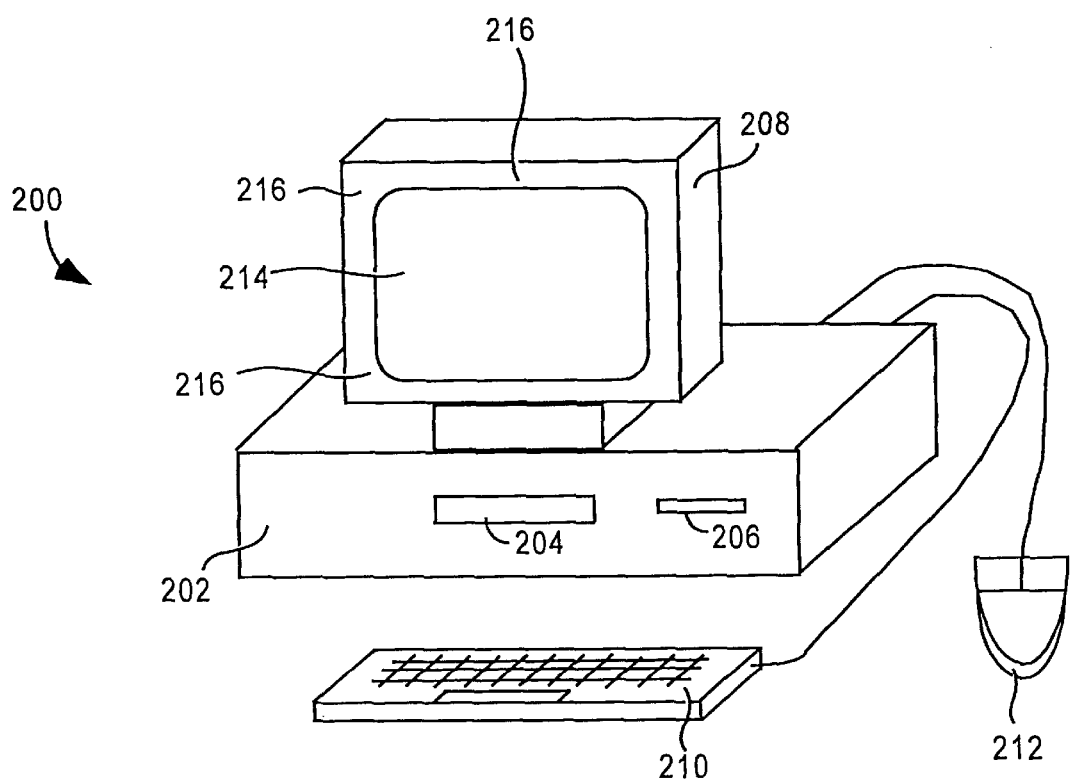
FIG. 2 is a diagram of a computer system.

FIG. 2 is a diagram of a computer system 200. The computer system 200 is a representative computer system suitable for hosting an input device according to the invention. The computer system 200 includes a computer housing 202 having a CD-ROM drive 204 and a floppy drive 206. The computer system 200 also includes a display device 208, a keyboard 210 and a pointing device (e.g., mouse) 212. The computer system 200 illustrated in FIG. 2 is a desktop computer system in which the display device 208 is normally a separate article of manufacture that couples to the computer housing 202 through a cable (not shown). The keyboard 210 and the pointing device 212 of the computer system 200 enable a user to provide user input to the computer system 200.

As previously noted, the invention pertains to an input device based on a grid of light that is used by an electronic device such as a computer. According to one embodiment of the invention, an input device is placed over a screen area 214 of the display device 208 and affixes to a peripheral portion 216 of the display device 208 that surrounds the screen area 214. Preferably, the input device does not extend over or block the screen area 214. Alternatively, the input device could be made integral with the display device 208. A user is able to provide user input to the computer system 200 by interrupting certain portions of the grid of light produced by the input device. Hence, the input device is different from conventional touch screens or pen-based screens, yet provides positional information to the computer system 200 in much the same way. According to another embodiment of the invention, an input device can be placed over or integral with a display screen of a portable computer. Although an input device according to the invention is preferably placed over or integral with a display screen, it should be recognized that an input device according to the invention can also be placed over surfaces other than display screens. For example, the input device could surround a pad, board or tablet for pen or touch input.

The input device could also be used in various environments other than for user input to computer systems. For example, the input device could be used for robotics positioning where the input device provides robotic positioning information. As another example, the input device could be used with a safety or emergency sensor where interruption of the light beam operates as a switch.

Figure 3:
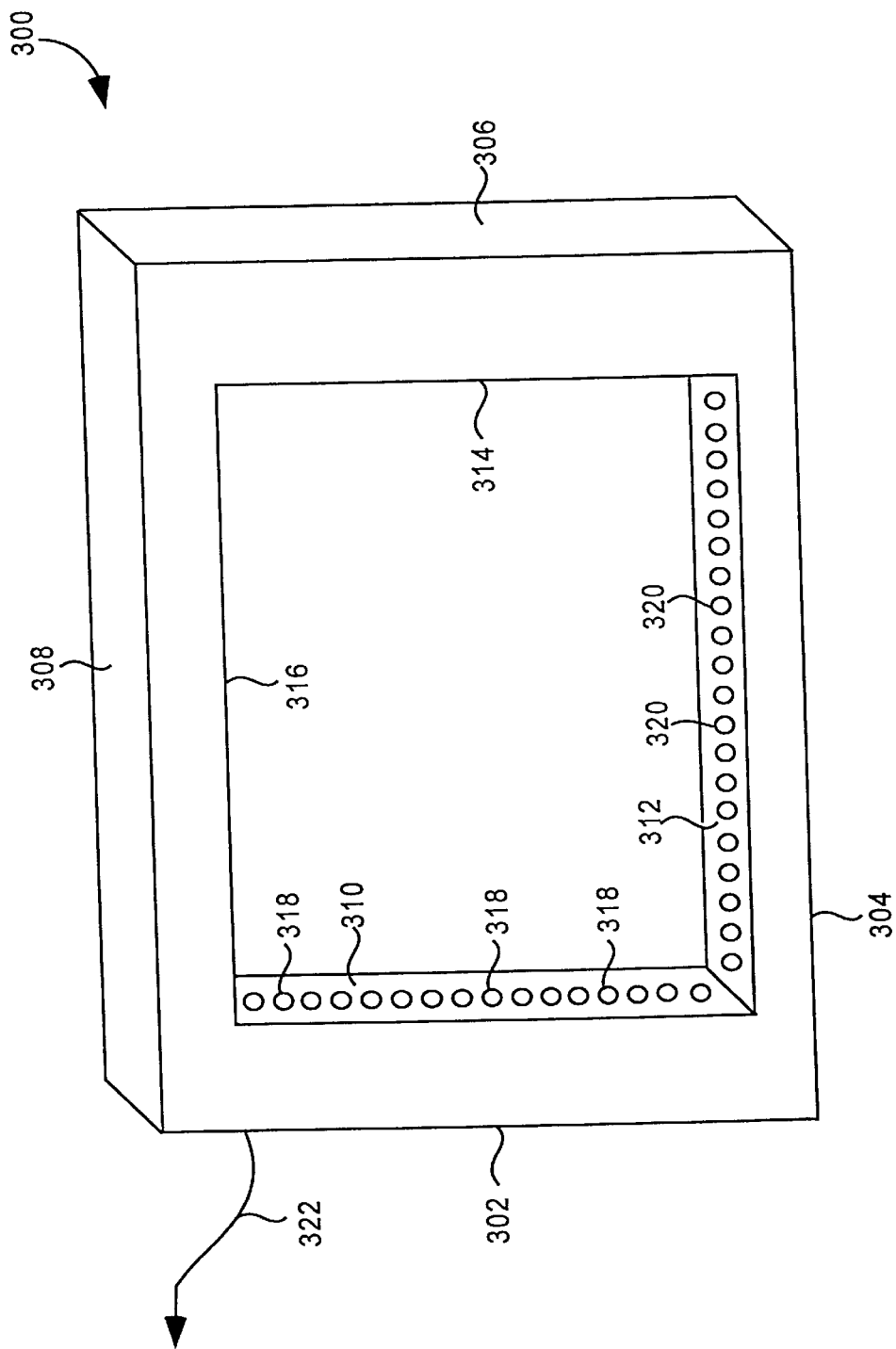
FIG. 3 is a diagram of an input device according to an embodiment of the invention.

FIG. 3 is a diagram of an input device 300 according to an embodiment of the invention. The input device 300 is a rectangular structure having a left side 302, a bottom side 304, a right side 306, and a top side 308. At two of the sides, the input device 300 produces numerous parallel light beams, and at the other two sides, the input device 300 receives numerous parallel light beams. Light detectors associated with the input device 300 interpret the received light beams to determine a positional reference of any user input with respect to the rectangular structure. The input device 300 includes a waveguide structure that directs light either from a light source or to the light detectors. The waveguide structure contains waveguide sections 310–316, with each of the waveguide sections 310–316 having a plurality of waveguides. The waveguides operate as light channels. In FIG. 3, the waveguide sections 310 and 312 are depicted as having a plurality of waveguides 318 and 320, respectively. Each waveguide is used to either produce a light beam or receive a light beam.

In this embodiment, the input device 300 is placed around a screen area of a display device for a computer system. For example, the input device 300 can be placed around the screen area 214 of the display device 208 of the computer system 200 illustrated in FIG. 2 by affixing the input device 300 to the peripheral portion 216 of the display device 208. The input device 300 can be held in place in a variety of ways. For example, the input device could be fabricated or assembled into the display device, or mechanically attached to the peripheral portion of the display device that surrounds the display device 308. In one case, a snap-in plastic frame holds the components of the input device 300 and the plastic frame can be incorporated into the display device 208. Alternatively, in the another case where the display device is a flat display (e.g., flat panel display for portable computer), a subassembly holding the components of the display device can be incorporated into the metal bezel that surrounds the flat display.

Although FIG. 3 illustrates the input device 300 as having a rectangular structure, the input device according to the invention need not be regular or rectangular. In fact, the waveguide structure utilized with the input device according to the invention provides flexibility in the shape that the input device takes.

Figure 4:
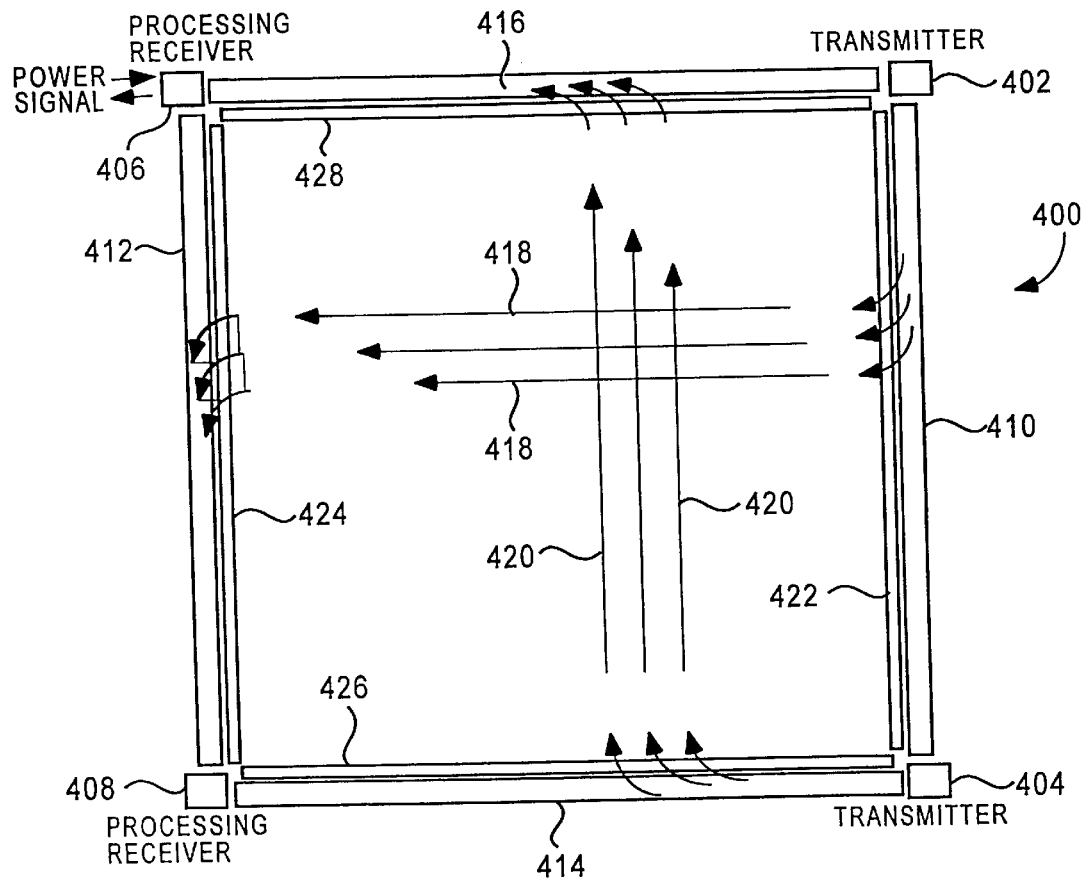
FIG. 4 is a schematic diagram of an input device according to an embodiment of the invention.

FIG. 4 is a schematic diagram of an input device 400 according to an embodiment of the invention. The input device 400 is a detailed diagram of the input device 300 in which two light sources and two receivers are respectively utilized to transmit and receive a grid of light. FIG. 4, however, does not depict a housing for the input device 400 such as is depicted in FIG. 3 for the input device 300.

The input device 400 includes a first transmitter 402, a second transmitter 404, a master receiver 406 and a slave receiver 408. In addition, the input device 400 includes waveguide sections 410, 412, 414 and 416. The arrangement of the waveguide sections 410–416 are such that they are placed around the periphery of an input area (i.e., a screen area of a display device). The slave receiver 408 communicates with the master receiver 406, and the master receiver 406 communicates with a host computer (e.g., the computer system 200).

The input device 400 may also include lens sections 422, 424, 426 and 428 that would also be preferably within the housing for the input device 400, though not illustrated in FIG. 3. Each of the lens sections 422, 424, 426 and 428 respectively correspond to the waveguide sections 410, 412, 414 and 416. The arrangement of the lens sections 422, 424, 426 and 428 are proximate to the waveguide sections 410–416 and are thus placed around the periphery of an input area (i.e., a screen area of a display device).

The operation of the input device 400 is as follow. When the transmitter 402 is activated, light is coupled into the end of the waveguide section 410 adjacent to the transmitter 402. The light that is coupled into the waveguide section 410 is then directed to a plurality of waveguides (i.e., light channels) within the waveguide section 410. Each of these waveguides within the waveguide section 410 produces a horizontal beam of light 418 that traverses across the screen area of the display device to the waveguide section 412. The waveguide section 412 contains a plurality of waveguides that correspond to the waveguides in the waveguide section 410. The beams of light 418 from the waveguide section 410 are directed towards and aligned with the waveguides in the waveguide section 412 so that the light beams being received are directed to light detecting elements of the slave receiver 408. The slave receiver 408 abuts (or nearly abuts) to the end of the waveguide section 412 so as to receive the light from each of the respective waveguides within the waveguide section 412 at the light detecting elements of the slave receiver 408.

Likewise, when the transmitter 404 is activated, light is coupled into the end of the waveguide section 414 adjacent to the transmitter 404. The light that is coupled into the waveguide section 414 is then directed to a plurality of waveguides (i.e., light channels) within the waveguide section 414. Each of these waveguides within the waveguide section 414 produces a vertical beam of light 420 that traverses across the screen area of the display device to the waveguide section 416. The waveguide section 416 contains a plurality of waveguides that correspond to the waveguides in the waveguide section 414. The beams of light 420 from the waveguide section 414 are directed towards and aligned with the light channels in the waveguide section 416 so that the light beams being received are directed to light detecting elements of the master receiver 406. The master receiver 408 abuts (or nearly abuts) to the end of the waveguide section 416 so as to receive the light from each of the respective waveguides within the waveguide section 416 at the light detecting elements of the master receiver 406.

When the input device 400 includes the lens sections 418–424, the operation is basically the same, though enhanced by mitigating spreading. The benefit of using lenses is that the light is collimated such that the light beams can traverse larger screen areas and the fabrication of the waveguide sections is simplified. The horizontal beams of light 418 that leave the waveguide section 410 are collimated by the lens section 422, and then focused again by the lens section 424 so that the horizontal beams of light 418 are received by the waveguides in the waveguide section 412. Likewise, the horizontal beams of light 420 that leave the waveguide section 414 are collimated by the lens section 426, and then focused again by the lens section 428 so that the horizontal beams of light 420 are received by the waveguides in the waveguide section 416. The transmitters 402 and 404 are preferably light sources. For example, each of the transmitters 402 and 404 can be a Light-Emitting-Diode (LED). The wavelength of the light emitted by the transmitters can vary widely. However, the wavelength is preferably in the range of 0.38 to 1.10 micrometers. More preferably, the wavelength of the light is in the range of 0.40 to 0.48 micrometers. Alternatively, the wavelength of the light is in the range of 0.70 to 0.95. In one embodiment, the LED used as the transmitters can be a blue gallium nitride LED with a wavelength of about 0.43 micrometers. The waveguide sections 410–416 are explained below with reference to FIGS. 5, 6A, 6B, 6C and 6D.

The slave receiver 408 and the master receiver 406 can be designed in a number of different ways. For example, the receivers 406 and 408 can be implemented by customized Application Specific Integrated Circuits (ASICs) or other circuits with photosensitive areas.

The receivers 406 and 408 also couple to or include circuitry that converts photosensitive measurements from the photosensitive areas to a digital quantity, and then transmits the digital quantities to the host computer. This circuitry can be implemented in many forms, including on a dedicated integrated circuit (IC) or on the ASIC or other circuits containing the photosensitive areas. Regardless of implementation, the receivers 406 and 408 perform processing tasks to operate the input device 400. The advantage of using an ASIC approach is that photosensors (light detecting elements) can by formed on the same integrated circuit as logical elements for performing the other processing tasks performed by the receivers 406 and 408. The photosensors can also be made in a number of ways. Charge-Coupled Devices (CCD) are suitable for light detection but their circuitry requires more silicon and consumes more power the CMOS circuits. CMOS technology cannot fabricate CCD sensors, but other photosensors can be made using CMOS technology as well known in the art. Additional details on the ASIC approach are discussed below with reference to FIG. 7C.

Figure 5:
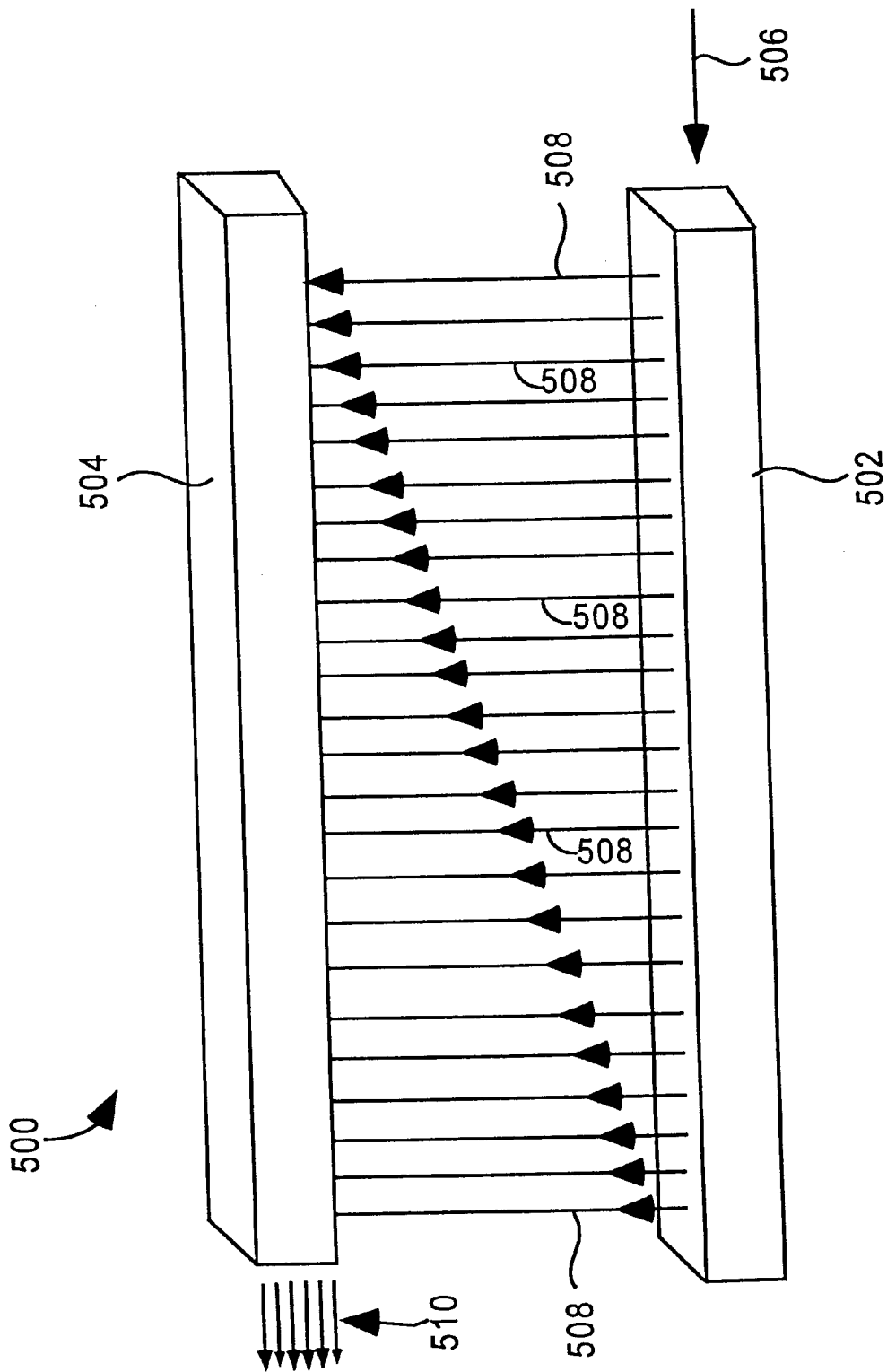
FIG. 5 illustrates a schematic diagram of a waveguide arrangement according to an embodiment of the invention.

FIG. 5 illustrates a schematic diagram of a waveguide arrangement 500 according to an embodiment of the invention. The waveguide arrangement 500 depicts optical coupling from a light source, through a pair of waveguides sections, to a receiver. The waveguide arrangement 500, for example, is suited for the waveguides sections 414 and 416 of the input device 400 illustrated in FIG. 4.

The waveguide arrangement 500 includes a first waveguide section 502 and a second waveguide section 504 that form a pair of waveguides sections for one direction of input. When light 506 is applied to an end of the waveguide section 502, a plurality of light beams 508 are formed and directed towards the waveguide section 504 by a plurality of light transmitting waveguides (i.e., light transmitting channels) in the waveguide section 502. Each of the light beams 508 is directed to a corresponding light receiving waveguide (i.e., light receiving channel) of the waveguide section 504. The light receiving waveguides of the waveguide section 504 then directs the light being received from the light beams 508 to an end of the waveguide section 504 where a plurality of light beams 510 are produced (for a receiver). Each of the light beams 510 corresponds to the light received in one of the light receiving waveguides of the waveguide section 504. The direction of input that the waveguide arrangement 500 is useful for determining is perpendicular to the light beams 508 (i.e., horizontal in FIG. 5).

Figure 6A:
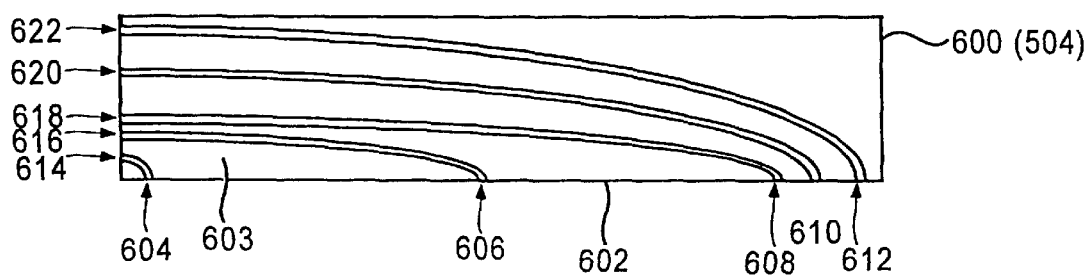
FIGS. 6A and 6B are cross-sectional diagrams of the waveguides illustrated in FIG. 5.
Figure 6B:
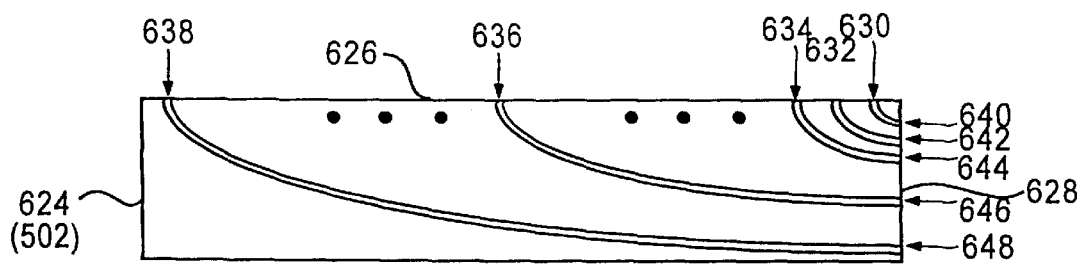

FIGS. 6A and 6B are cross-sectional diagrams of the waveguide sections 504 and 502 illustrated in FIG. 5. In FIG. 6A, a waveguide section 600 is shown as having a light receiving side 602 and a light output end 603. The light receiving side 602 includes a plurality of waveguides (channels) to receive light. In particular, the light receiving side 602 is illustrated as having numerous light receiving waveguides, of which light receiving waveguides 604, 606, 608, 610 and 612 are illustrated. Each of these light receiving waveguides has a corresponding light output waveguide (channel) 614, 616, 618, 620 and 622, respectively, at the light output end 603 of the waveguide section 600. The light receiving waveguides 604, 606, 608, 610 and 612 and the light output waveguides 614, 616, 618, 620 and 622 are internal to the waveguide section 600.

In FIG. 6B, a waveguide section 624 includes a light output side 626 and a light input end 628. The light output side 626 has a plurality of light output waveguides (channels) 630, 632, 634, 636 and 638. Each of the light output waveguides 630, 632, 634, 636 and 638 corresponds to a respective to one of the light receiving waveguides 612, 610, 608, 606 and 604 of the waveguide section 600. The light input end 628 of the waveguide section 624 is illustrated as having numerous light input waveguides (channels), of which light input waveguides 640, 642, 644, 646 and 648 are illustrated. Each of the light input waveguides 640, 642, 644, 646 and 648 has a corresponding light output waveguide 630, 632, 634, 636 and 638, respectively, at the light output side 626 of the waveguide section 624. The light input waveguides 640, 642, 644, 646 and 648 and the light output waveguides 630, 632, 634, 636 and 638 are internal to the waveguide section 600.

Figure 6C:
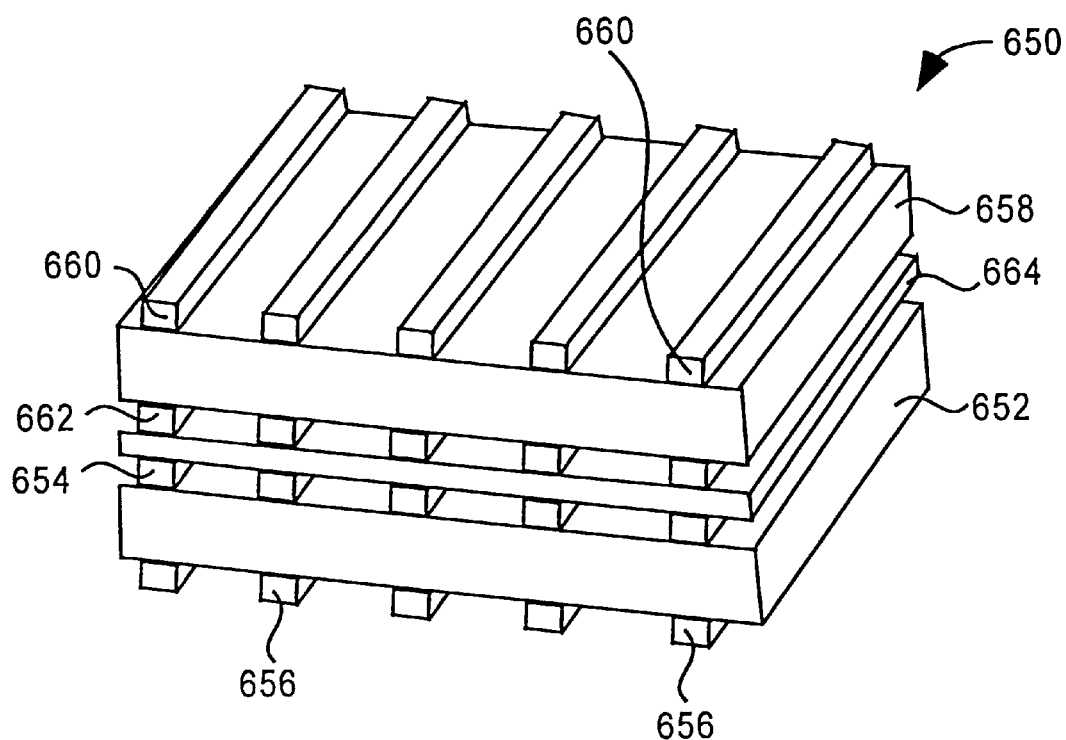
FIG. 6C is a diagram illustrating a structural construction for a waveguide section according to an embodiment of the invention.

To keep the size of the waveguides sections small yet permit them to provide high resolution, the waveguide sections preferably include layers of waveguides. FIG. 6C is a diagram illustrating a structural construction for a waveguide section 650 according to an embodiment of the invention. The waveguide section 650 includes a first substrate 652 that supports waveguides 654 on an upper surface of the first substrate 652 and waveguides 656 on a lower surface of the first substrate 652. The waveguide section 650 further includes a second substrate 658 that supports waveguides 660 on an upper surface of the second substrate 658 and waveguides 662 on a lower surface of the second substrate 658. The height, width and shape of the waveguides 660, 656 can vary widely. However, in one suitable embodiment, the height is about 5 micrometers, the width is about 10 micrometers, and the shape is rectangular. A layer of polyester 664 is then sandwiched between the first and second substrates 652 and 658 and their associated waveguides and holds the waveguide section 650 together with optical cement. The advantage of the layers of waveguides of the waveguide section 650 is to facilitate the providing of high resolution. The structural construction for the waveguide section 650 is also referred to as a waveguide sandwich. For ease of illustration, the waveguide section 650 depicted in FIG. 6C does not illustrate the curving of the channels shown in FIGS. 6A and 6B. It is desirable to keep the assembly (housing) for the input device to a profile height of less than 2 mm. In one embodiment, an individual waveguide layer (i.e., glass plate with waveguides) is 760 microns thick, with the glass plate being about 0.7 mm thick and a bisbenzocyclobutene (BCB) layer being of varying thickness (e.g., in a range of about 0.5 to 50 micrometers thick. Hence, with two individual waveguide layers (i.e., glass plates with rows of individual waveguides on both sides) and a layer of polyester (e.g., about 5 mils thick) between the two waveguides layers, totals to a thickness of about 4 mm for a waveguide sandwich.

Figure 6E:
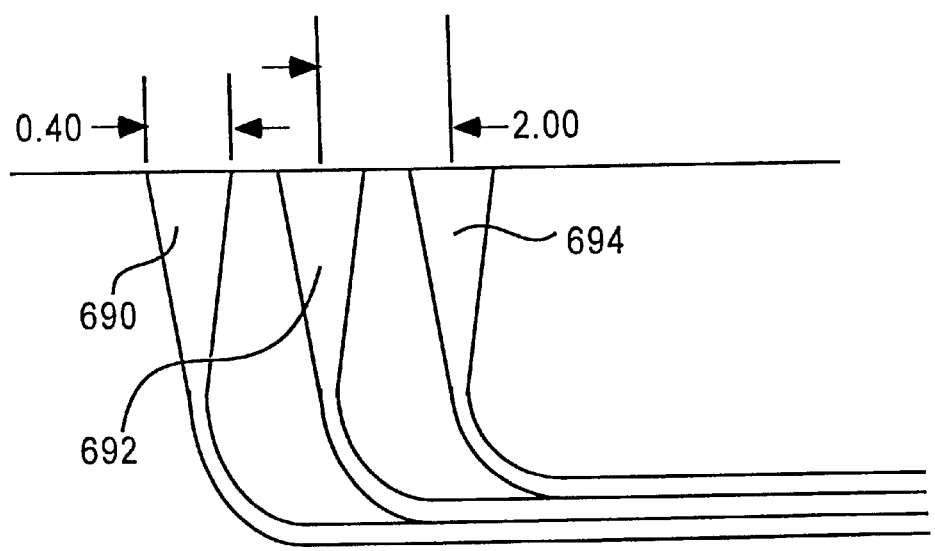
FIG. 6E is a diagram illustrating output waveguides.
Figure 6D:
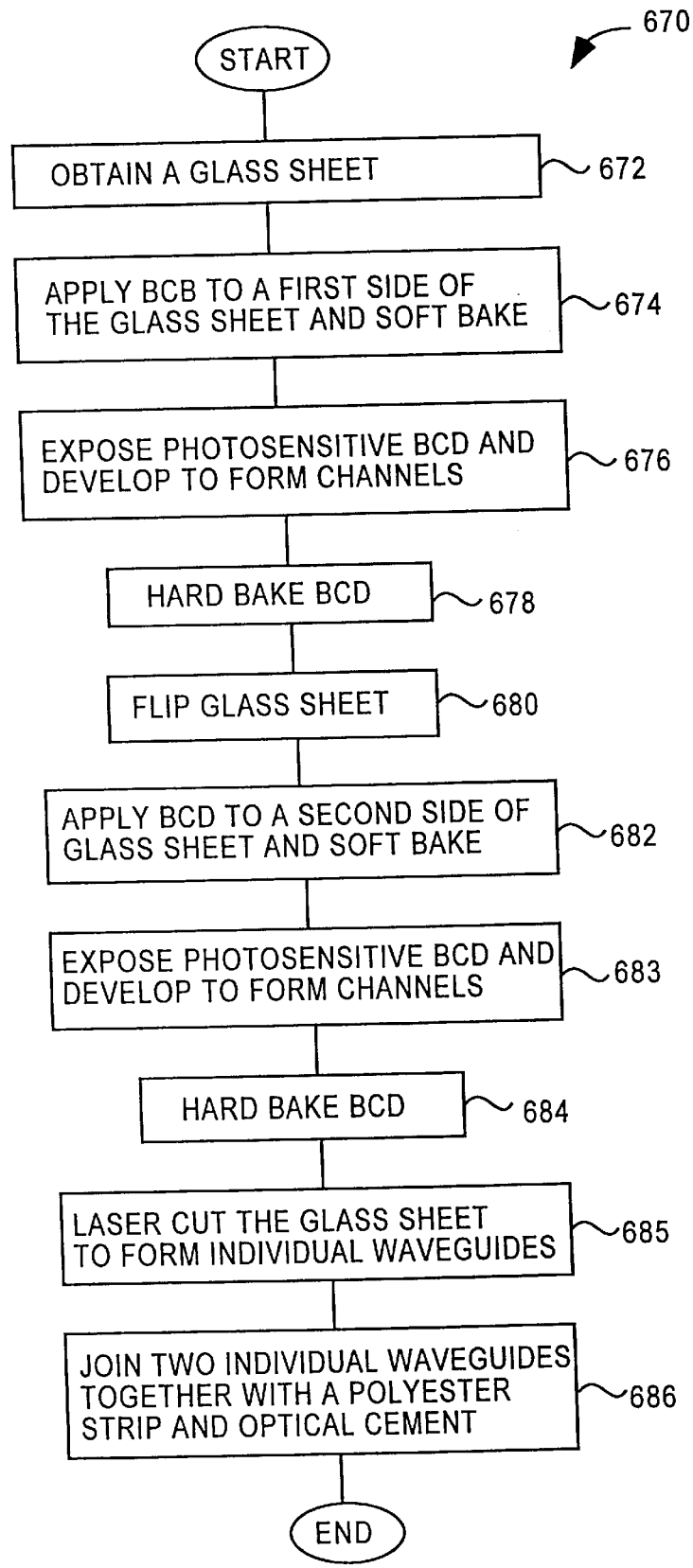
FIG. 6D is a flow diagram of fabrication procedures for making the waveguide illustrated in FIG. 6C according to one embodiment of the invention.

FIG. 6D is a flow diagram of fabrication procedures 670 for making the waveguide section 650 illustrated in FIG. 6C according to one embodiment of the invention. Initially, the fabrication procedures 670 obtain 672 a sheet of glass. The glass sheet operates as a supporting substrate for the construction of individual waveguides. Next, a layer of BCB is applied 674 to a first side of the glass sheet and soft baked. BCB is a photosensitive material. Then, the photosensitive BCB is exposed and developed 676 to form channels. Next, the BCB layer is hard baked 678. In other words, the channels are formed by a lithographic process. Thereafter, channels may be formed on the other side of the substrate by the following processing. The glass sheet is flipped 680. A layer of BCB is applied 682 to a second side of the glass sheet and soft baked. Then, the photosensitive BCB is exposed and developed 683 to form channels. The BCB layer is then hard baked 684. The glass sheet is then laser cut 685 into individual waveguides. The laser etching and cutting are standard industrial processes. Finally, two individual waveguides may be combined 686 together with a polyester strip and an optical cement (see FIG. 6C). The polyester strip serves to separate or isolate the individual waveguides being combined from one another. Following block 686, the fabrication procedures 670 are complete and end.

FIG. 6E is a diagram illustrating flared waveguides 690, 692 and 694. The flared waveguides may be used at an end of the transmitting and/or receiving waveguides. For example, the portions of the light output waveguides 630–638 near the light output side of the waveguide section 624 may be flared or tapered as illustrated in FIG. 6E. By flaring the light output waveguides light diffractive spreading of the light can be reduced. Similarly, flaring light input waveguides increases the area into which incident light couples.

Figure 6F:
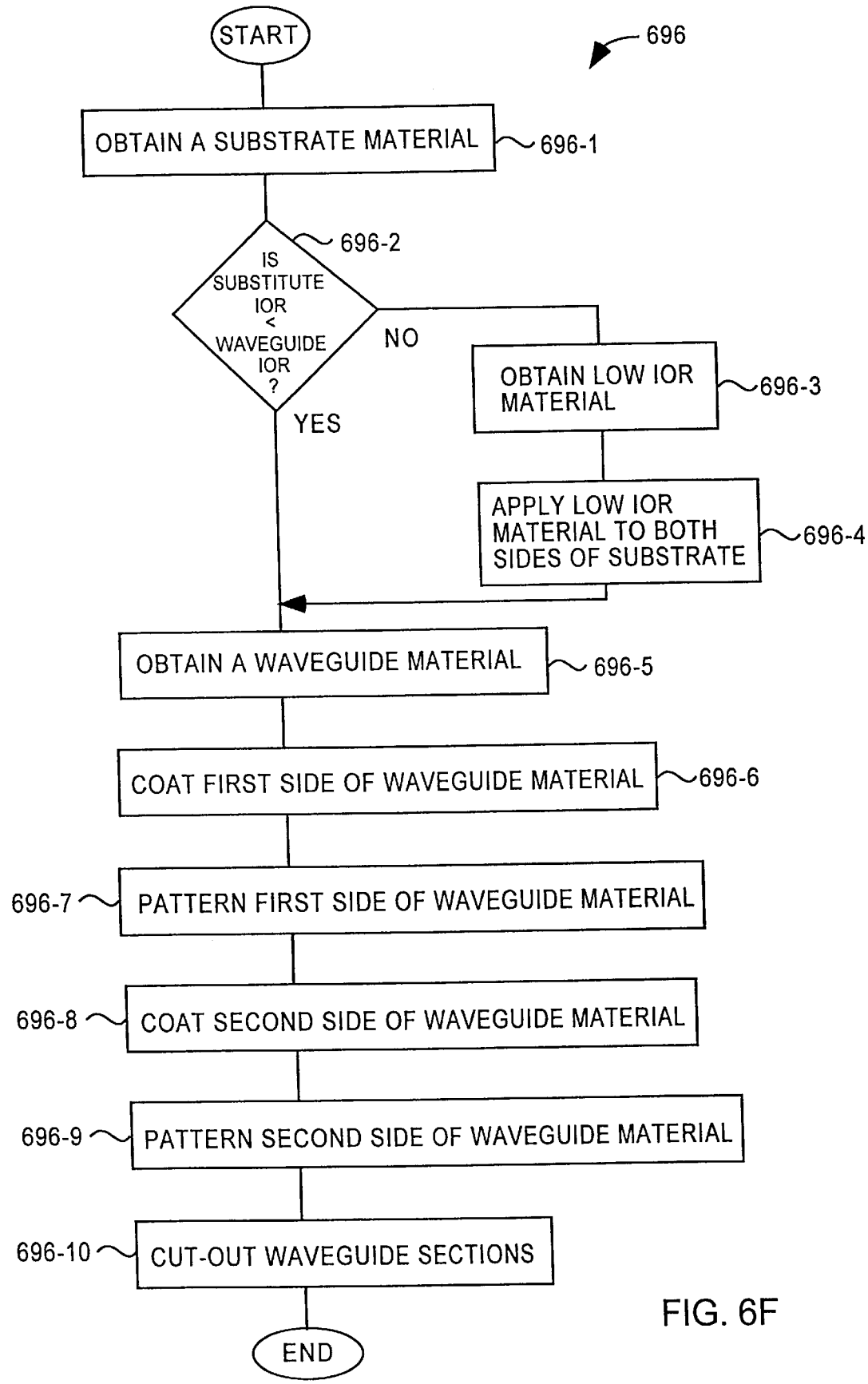
FIG. 6F is a flow diagram of fabrication procedures for making a waveguide structure according to another embodiment of the invention.

FIG. 6F is a flow diagram of fabrication procedures 696 for making a waveguide structure according to another embodiment of the invention. In general, a waveguide structure includes a substrate, a low index of refraction layer, and a high index of refraction layer. In the embodiment discussed with reference to FIG. 6D, glass can serve as both the substrate and the low index of refraction layer, and a layer of BCB can serve as the high index of refraction layer.

In any case, the fabrication procedures 696 are as follows. Initially, a substrate material is obtained 696-1. A decision block 696-2 then determines whether the index of refraction (IOR) for the substrate material is lower than the index of refraction of a waveguide material to be used. When the decision block 696-2 determines that the index of refraction for the substrate material is not lower than the index of refraction of the waveguide material, then a material with a low index of refraction (low IOR) is obtained 696-3. The material is then applied 696-4 to both sides of the substrate. If the low IOR material requires baking or curing, then such an operation is performed. Accordingly, the substrate with the material on it has an index of refraction that is lower than the index of refraction of the waveguide material. On the other hand, when the decision block 696-2 determines that the index of refraction for the substrate material is lower than the index of refraction of the waveguide material, then blocks 696-3 and 696-4 are bypassed.

The desired characteristics for the substrate material include rigidity, low thermal coefficient of expansion, low water absorption, surface adherence to waveguide material of low IOR material, and low cost. Suitable substrate materials include glass, some plastics, ceramics. The desired characteristics for the low IOR layer include lower IOR than waveguide material, optical clarity, adheres to substrate material and waveguide material, applied as a coating or grown as a thin film, low thermal coefficient of expansion, low water absorption, and low cost.

Following block 696-4 or following block 696-2 when the decision block 696-2 determines that the index of refraction for the substrate material is lower than the index of refraction of the waveguide material to be used, a sheet of waveguide material is obtained 696-5. The desired characteristics for the waveguide material include higher IOR than the low IOR material or the substrate material, optical clarity, adherence to substrate material and waveguide material, applied as a coating or grown as a thin film, low thermal coefficient of expansion, low water absorption, and low cost. A first side of the waveguide material is then coated 696-6. Once coated, the first side of the waveguide material can be lithographically patterned 696-7 to form individual waveguides. A second side of the waveguide material is then coated 696-8. Once coated, the second side of the waveguide can be patterned 696-9 to form individual waveguides. Hence, with this processing individual waveguides are fabricated on both sides of the substrate, thereby increasing density of pixels (i.e., resolution) the waveguides can provide and reducing both size requirements and costs (see FIG. 6C). Thereafter, waveguide sections are cut-out 696-10 from the fabricated substrate and waveguide material.

Figure 7A:
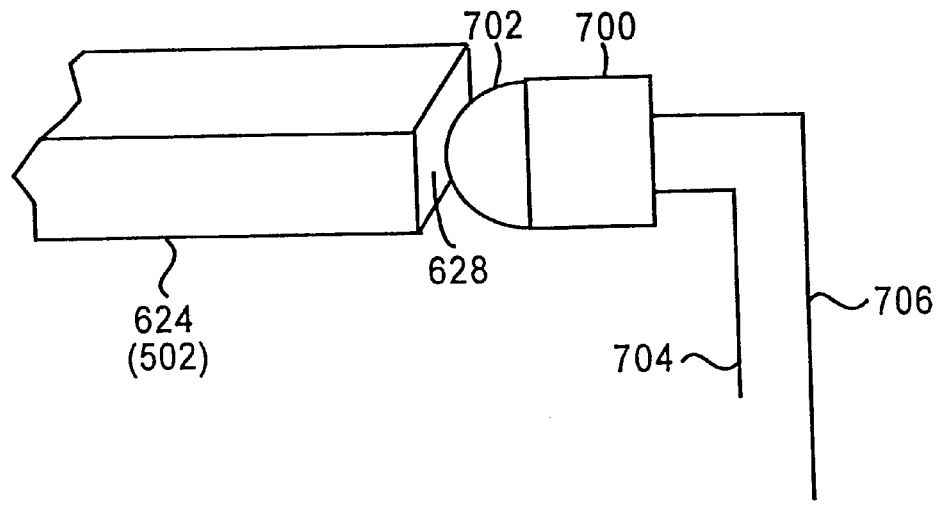
FIG. 7A is a diagram illustrating optical coupling of light into a waveguide.

FIG. 7A is a diagram illustrating optical coupling of light into a waveguide section. As illustrated, the waveguide section is the waveguide section 624 illustrated in FIG. 6B. In particular, a light-emitting diode (LED) 700 includes a light output portion 702 from which light is output based on the electrical signals provided to terminals 704 and 706 of the LED 700. The light output portion 702 abuts (or nearly abuts) against an end 628 of the waveguide section 624 and thereby supplies light into the waveguide section 624. Preferably, the LED 700 has a relatively short wavelength such as a blue LED. More particularly, the LED 700 is a 430 nanometer (nm) blue gallium nitride LED and available from Stanley Corporation. The output light intensity for the Stanley blue gallium nitride LED is approximately 100 millicandelas. The LED comes in a T1 package which is a small package with a diameter of approximately 3.2 millimeters (mm).

Figure 7B:
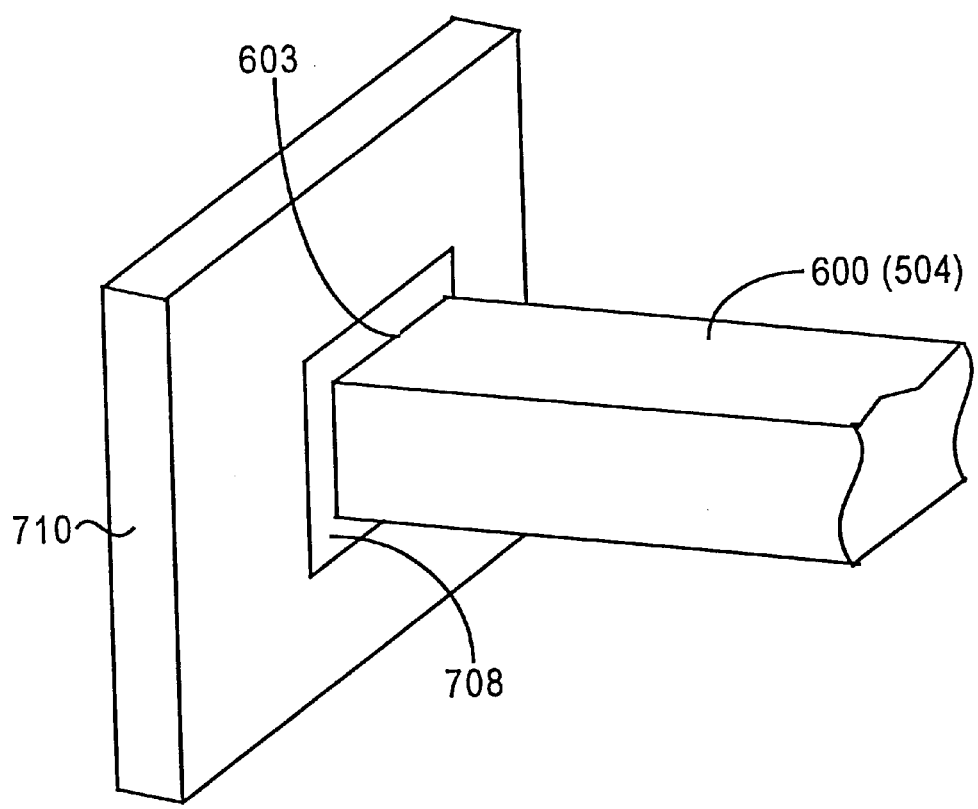
FIG. 7B is a diagram illustrating optical coupling of a waveguide to a receiver.

FIG. 7B is a diagram illustrating optical coupling of a waveguide section to a receiver. As illustrated, the waveguide section is the waveguide section 600 illustrated in FIG. 6A. In particular, the waveguide section 600 that is receiving and directing light via its light receiving waveguides 604–612 to a receiver optically coupled to the waveguide section 600. In this illustrated embodiment, the light receiving waveguides 604–612 optically couple to a light detection region 708 of an integrated circuit device 710 that operates as the receiver. The integrated circuit device 710 can be affixed to (or proximate to) the waveguide section 600 in a variety of ways. For example, the housing for the input device (see FIG. 3), an adhesive or some other mechanical structure can provide the mechanical support of the integrated circuit device 710 with respect to the waveguide section 600 so as to provide the needed optical coupling.

Figure 7C:
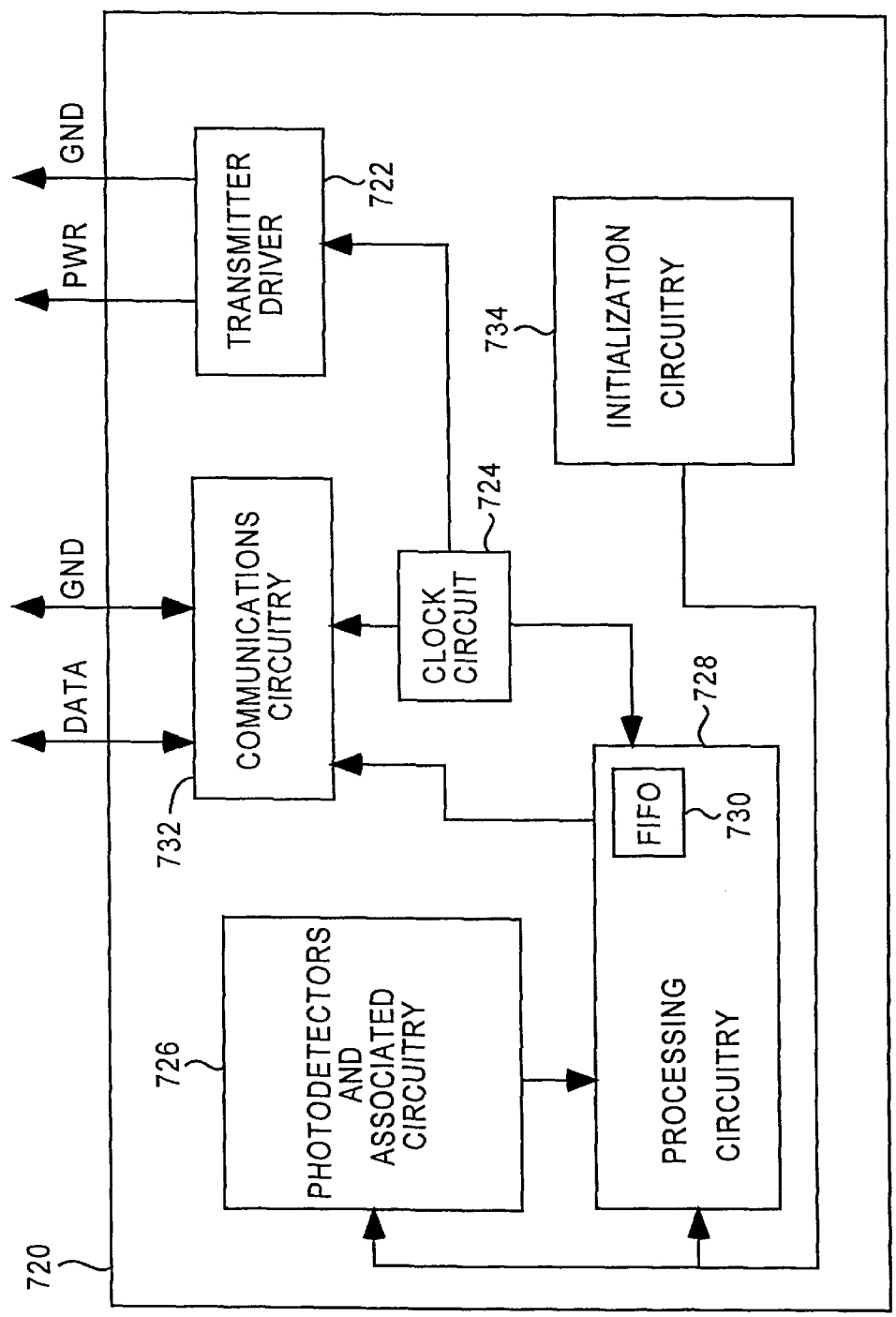
FIG. 7C is a block diagram of an ASIC layout for implementing a receiver according to an embodiment of the invention.

FIG. 7C is a block diagram of an ASIC layout 720 for implementing a receiver according to an embodiment of the invention. The ASIC layout 720 includes various functional logic blocks. A transmitter driver 722 supplies power (PWR) and ground (GND) signals to the transmitters (light sources) to cause them to emit light. A clock circuit 724 supplies a clock signal to the transmitter driver 722 to thereby control the operation of the transmitters in accordance with a duty cycle associated with the clock signal. The ASIC layout 720 also includes photodetectors and associated circuitry 726 that detect the light being received by the receiver. The output of the photodetectors and associated circuitry are signals indicating those of the pixels in an x and y directions that are dark. These output signals are then processed by processing circuitry 728. For example, the processing circuitry performs the shadow processing discussed below. The processing circuitry 728 includes a First-In-First-Out (FIFO) buffer 730 where data to be forwarded to a host computer is temporarily stored. Communications circuitry 732 retrieves the data stored in the FIFO buffer 730 and outputs the data to the host computer. The receiver 720 is electrically connected to the data (DATA) and ground (GND) signals. The processing circuitry 728 and the communications circuitry 732 also receive the clock signal from the clock circuit 724 for processing synchronized with the clock signal. The ASIC layout 720 further includes initialization circuitry 734 that is used to setup and initialize the photodetectors and associated circuitry 726 and the processing circuitry 728.

Figure 8:
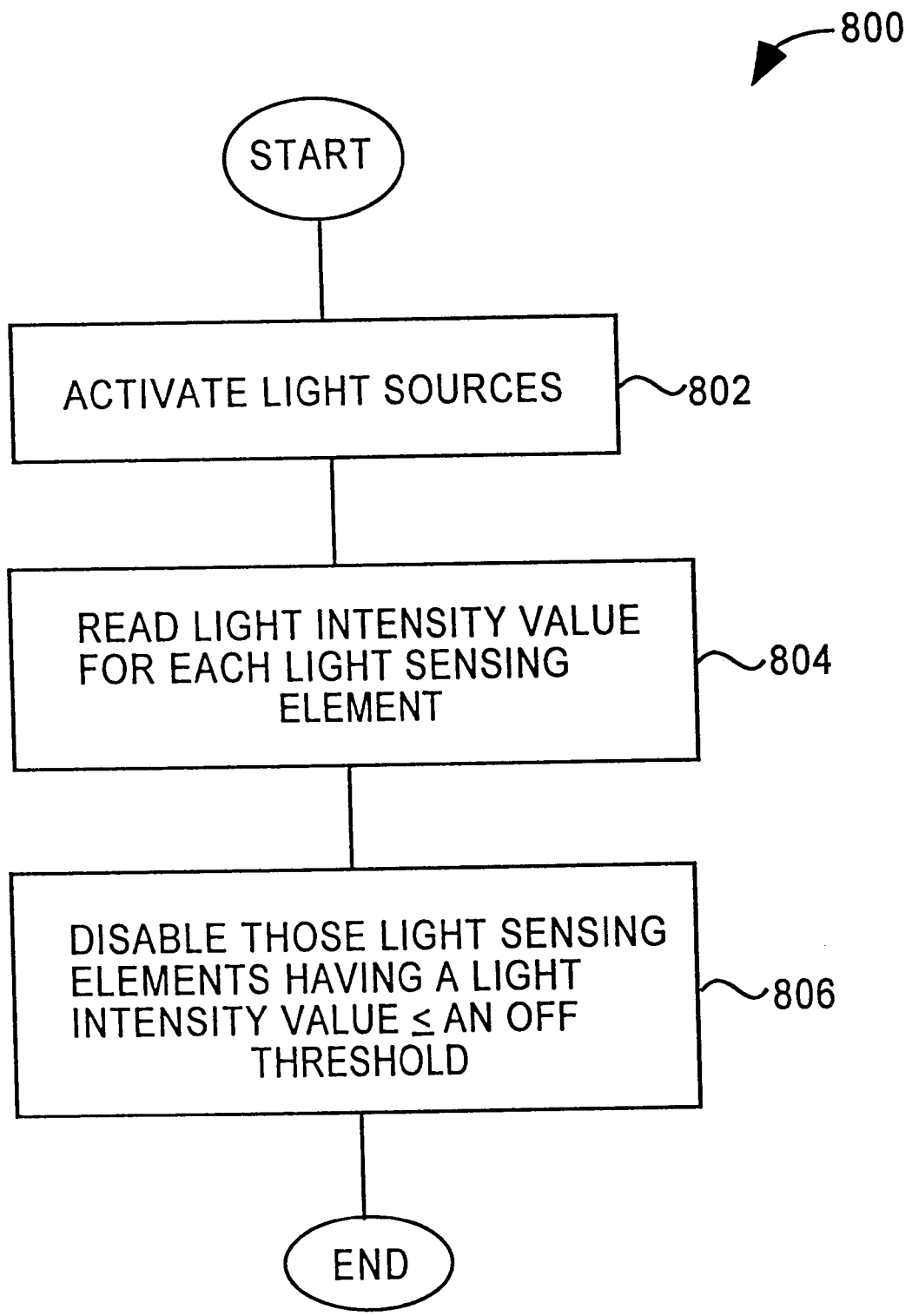
FIG. 8 is a flow diagram of initialization processing according to an embodiment of the invention.

FIG. 8 is a flow diagram of initialization processing 800 according to an embodiment of the invention. The initialization processing 800 initially activates 802 light sources. For example, with respect to FIG. 4, the light sources 402 and 404 (transmitters) would be activated. Next, a light intensity value for each light sensing element is read 804. Namely, with respect to FIG. 4, the light sensing elements of the receivers 406 and 408 would operate to measure the incoming light intensity value at each of its light sensing elements. Thereafter, the light sensing elements that have a light intensity value that is less than a predetermined threshold value are disabled 806. The light sensing elements that are disabled are no longer utilized because they do not correspond to light receiving channels of the corresponding waveguide. In other words, the initialization processing 800 operates to effectively align the light receiving channels of a waveguide with the appropriate light sensing elements of the receivers 406 and 408. Typically, such processing is desirable because it facilitates manufacturing, design and assembly of the input device 400, particularly since the channels within the waveguides are very narrow and the receivers typically will include an area of light sensing elements that exceeds the size of the end of the waveguide. For example, in FIG. 7B, the light detection region 708 of the integrated circuit device 710 is larger than the end 603 of the waveguide 600. Following block 806, the initialization processing 800 is complete and ends.

Figure 9:
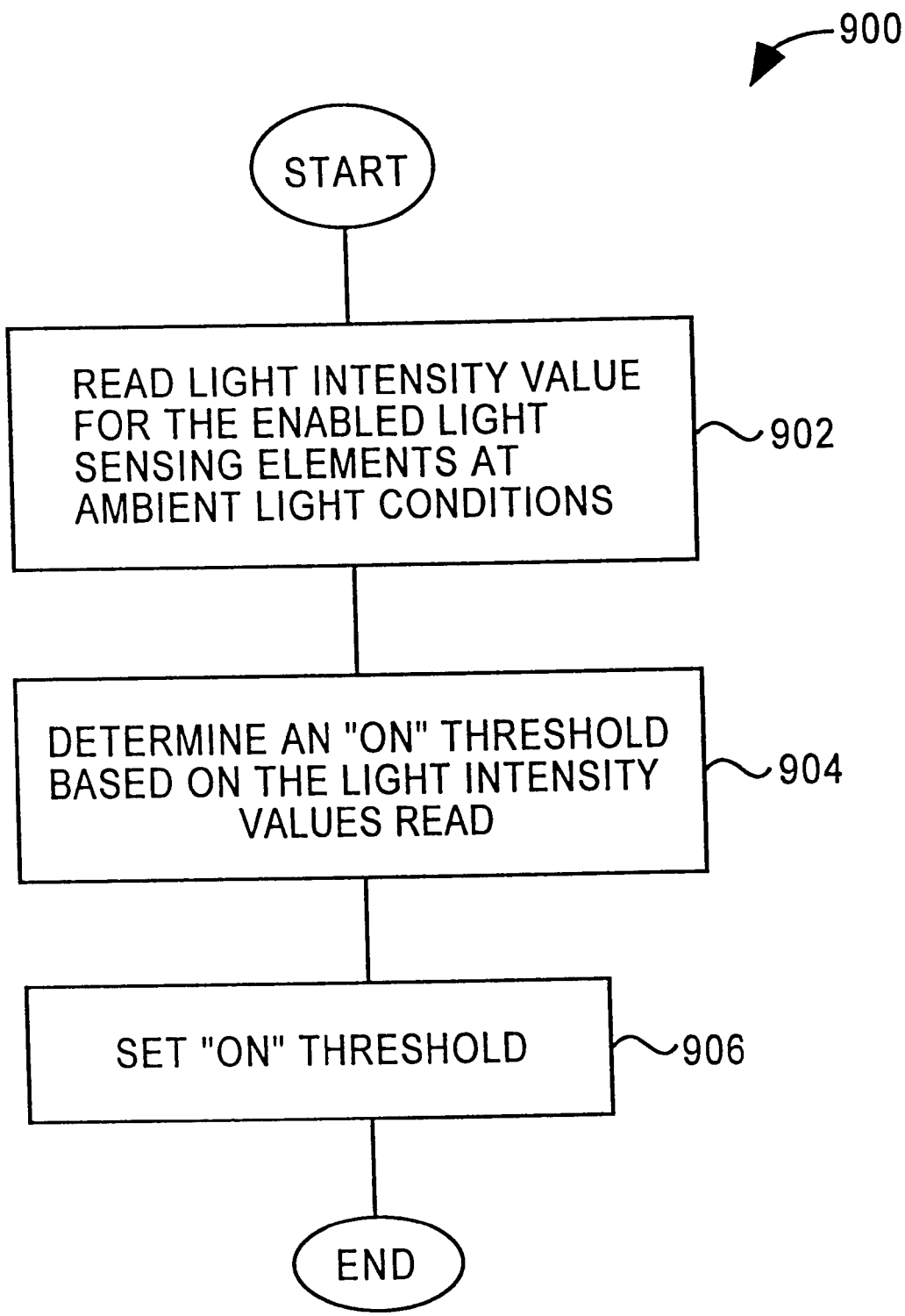
FIG. 9 is a flow diagram of threshold adjustment processing according to an embodiment of the invention.

FIG. 9 is a flow diagram of threshold adjustment processing 900 according to an embodiment of the invention. The threshold adjustment processing 900 initially reads 902 a light intensity value for each of the enabled light sensing elements at ambient light conditions. Then, an "on" threshold is determined 904 based on the light intensity values that have been read. Next, the "on" threshold is set 906 in the receivers. As an example, the "on" threshold can be set 906 by ambient current plus n(ambient current-dark current), where n is an integer. Following block 906, the threshold adjustment processing 900 is complete and ends.

The threshold adjustment processing 900 is used to periodically and frequently set the "on" threshold amount for the receivers so that the receivers are able to properly distinguish between an "on" and an "off" condition. By periodically and frequently updating the "on" threshold amount, the input device is able to compensate for changes in ambient light conditions that may effect the light intensity values measured by the light sensing elements. For example, if a user of a computer system having an input device according to the invention initially begins using the computer system in the dark, and then turns on a light (directing light towards the waveguides), the ambient light conditions change and the input device should not operate incorrectly due to such changes in ambient light conditions. Accordingly, the threshold adjustment processing 900 is able to compensate for changes in ambient light conditions so that the input device operates in a reliable manner without regard to ambient light conditions or changes thereto.

Figure 10A:
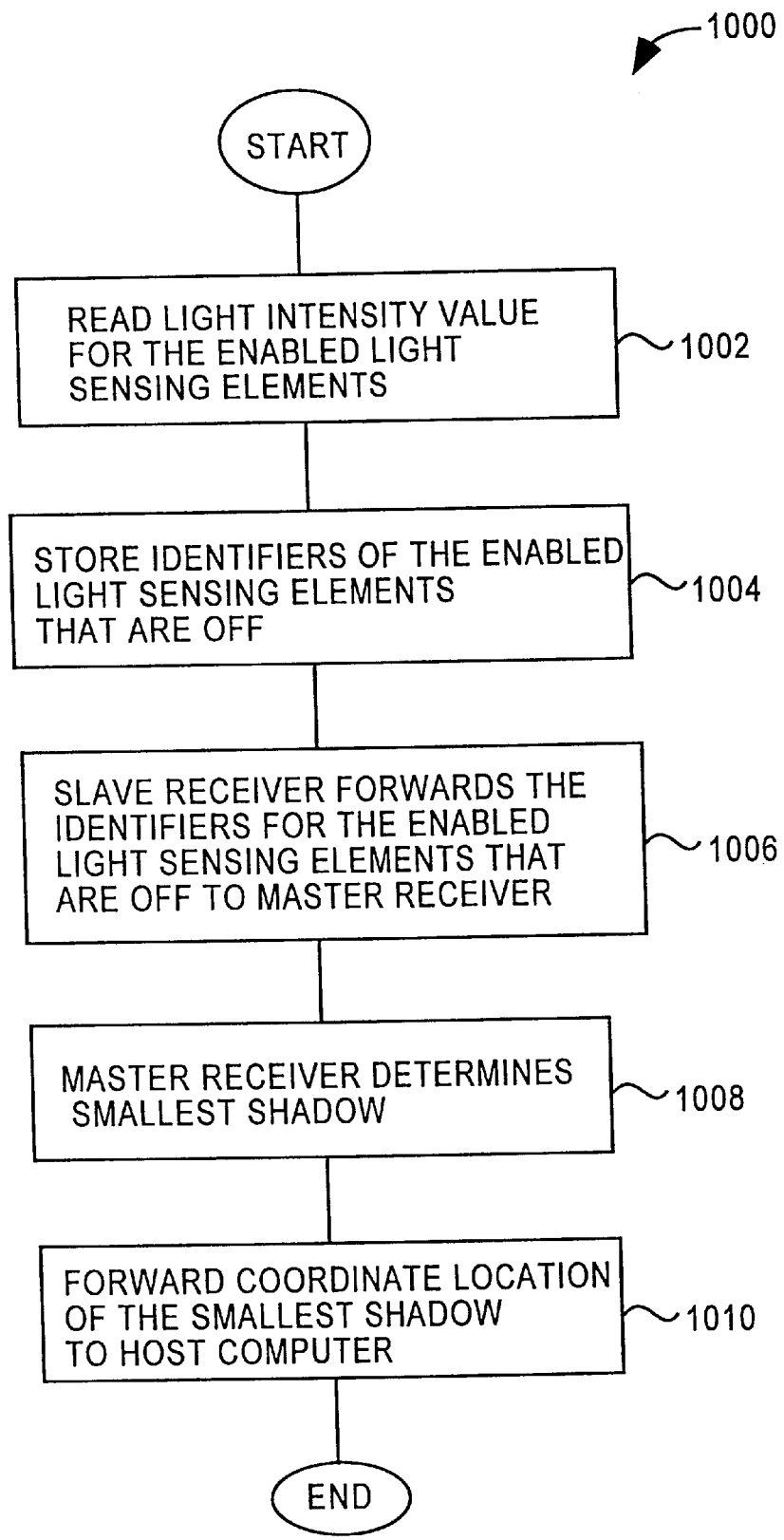
FIG. 10A is a flow diagram of shadow detection processing according to an embodiment of the invention.

FIG. 10A is a flow diagram of shadow detection processing 1000 according to an embodiment of the invention. The shadow being detected is associated with a user's touch or stylus touch to the input device according to the invention. The touching of a finger or stylus to a display device having the input device according to the invention mounted thereto causes a shadow to be produced because certain of the light beams produced by the input device will be blocked. The shadow results because certain of the light beams that crisscross (i.e., grid of light) over the surface of the screen area are blocked (or interrupted) and therefore the receivers measure very low intensities for these light sensing elements. The receivers will thus detect that these certain light beams as being "off" because they are blocked.

The shadow detection processing 1000 initially reads 1002 a light intensity value for each of the enabled light sensing elements. Then, for those of the enabled light sensing elements that are determined to be "off", identifiers are stored 1004. Next, a slave receiver forwards 1006 the identifiers for the enabled light sensing elements that are "off" to a master receiver. The master receiver then determines 1008 the smallest shadow from the identifiers. By the determining 1008 of the smallest shadow, the input device is able to distinguish a stylus or pen input from a user's hand simultaneously touching the screen. After the smallest shadow is determined 1008, the coordinate location of the smallest shadow is forwarded 1010 to the host computer. Following block 1010, the shadow detection processing 1000 is complete and ends.

Figure 10B:
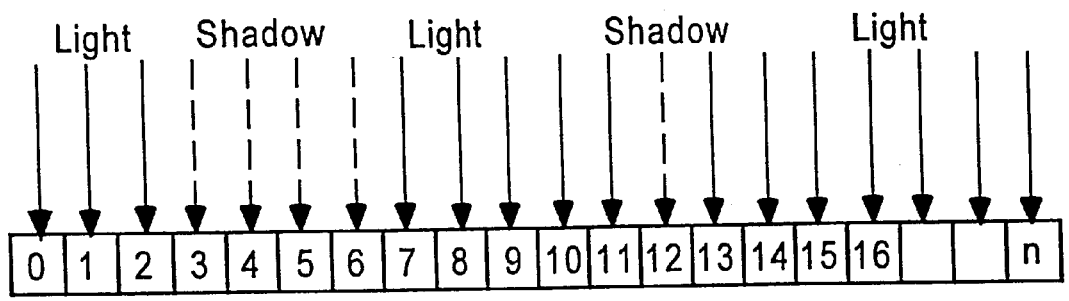
FIGS. 10B and 10C are diagrams illustrating examples of shadow detection processing according to an embodiment of the invention.
Figure 10C:
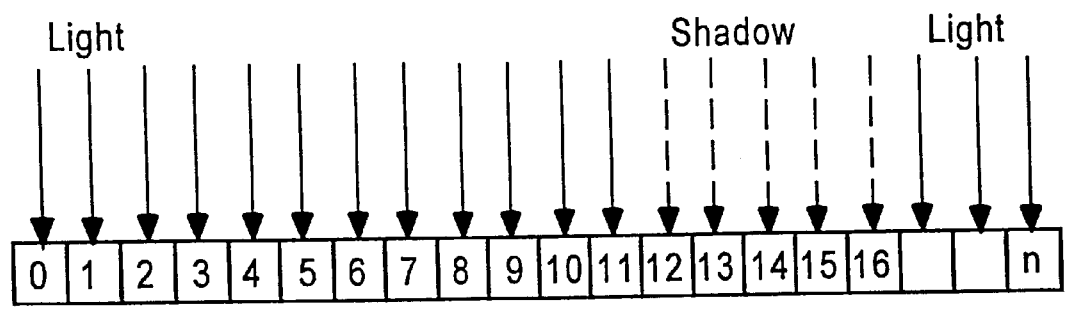

An example of the shadow detection processing 1000 is described with reference to FIGS. 10B and 10C. In FIGS. 10B and 10C, light detection cells are numbered 0,1,2,3, . . . n. In these examples, it is assumed that only those light detection cells not receiving light (e.g., dark cells) output a signal. In processing, the address of each dark cell is input to a logic array in order. The logic array then preferably first throws out all but first and last pixels of any shadows that may be present, which leaves a pattern first, last; first, last . . . in storage in a first-in-first-out (FIFO) buffer. For example, with respect to FIG. 10B, the FIFO would contain: 3,6; 12, 12. The processing then selects the smallest shadow and outputs its center and width. In this example, 12, 1 would be sent to a host computer. In another example, with respect to FIG. 10C, the FIFO would contain 12, 16, and thereafter 14, 5 would be sent to the host computer.

By selecting the smallest shadow to forward to the host computer, the shadow detection processing 1000 is able to filter out situations in which two objects simultaneously touch the screen, such as a stylus and a hand. By identifying and selecting the smallest shadow, the shadow detection processing 1000 is able to distinguish between the two objects and select the one appearing to be the one that is desired. However, this technique would not work when the shadow from the hand covers the shadow from the stylus, but usually this would not occur. The width of the shadow is sent because that gives the width of the stylus. This is useful for calligraphy on a pen screen, and it is potentially useful for measuring applications.

Additionally, as noted above, the input device according to the invention may optionally further include lenses (e.g., diffractive lenses) to collimate the light being output by the transmitting waveguide towards the receiving waveguide. The lenses could be individual lenses or an array of lenses. Given that the waveguides are small (e.g., 3–6 micrometers), the lenses are often referred to as micro lenses. Further, the reception side of the input device may also include lenses (e.g., diffractive lenses) to focus the light into the receiving waveguides.

Figure 11A:
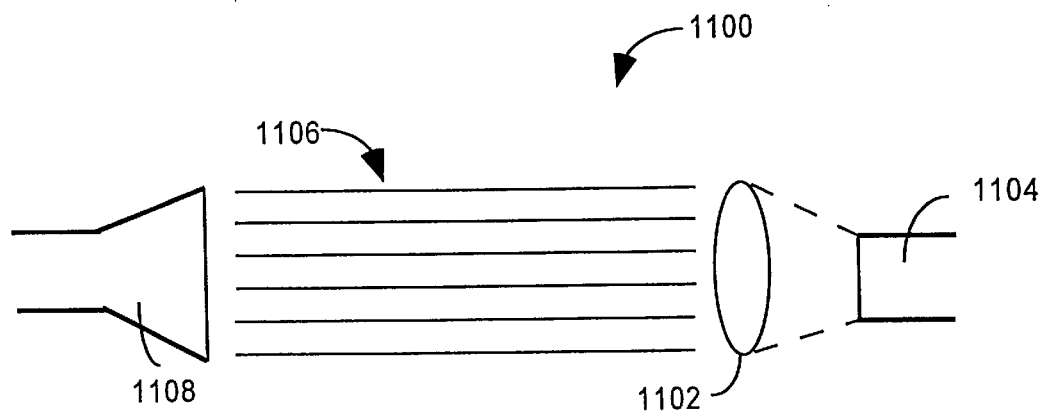
FIGS. 11A and 11B are schematic diagrams illustrating placement of a microlens proximate to waveguides to mitigate spreading of the light transmitted from a waveguide.
Figure 11B:
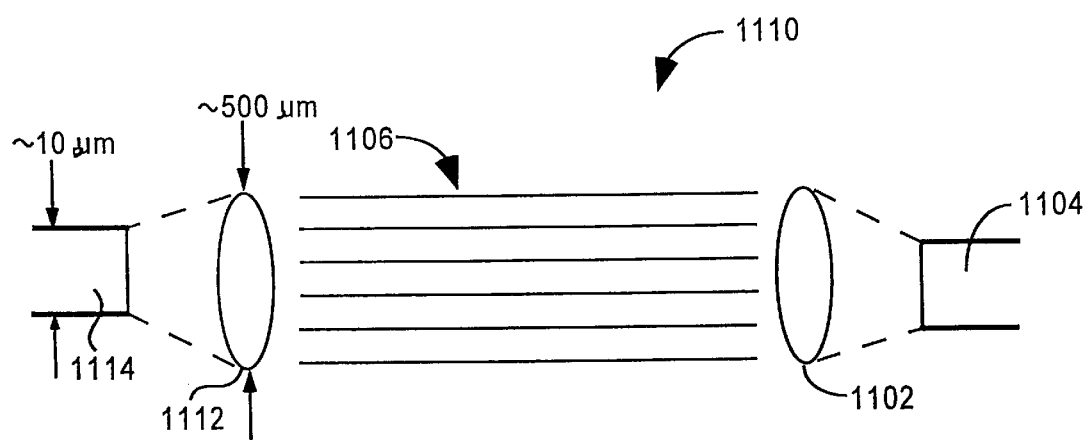

FIGS. 11A and 11B are schematic diagrams illustrating placement of a microlens proximate to waveguides to mitigate spreading of the light transmitted from a waveguide. In FIG. 11A, an optical arrangement 1000 places a microlens 1102 proximate to an output end of a waveguide 1104. The microlens 1104 operates to collimate the light emanating from the waveguide 1104. Hence, the light beam that traverses an input area is a collimated light beam 1106. A waveguide 1108 having a flared-open portion receives the collimated light beam after traversing the input area. The waveguide then directs the received light to a receiver. In FIG. 11B, an optical arrangement 1110 is similar to the optical arrangement 1000 on a transmission side, but differs on a receive side. In particular, a lens 1112 receives the collimated light after traversing the input area. The lens 1112 focuses the received collimated light beam on a waveguide 1114.

The use of lenses serves to simplify the construction of the waveguides because it is difficult and time-consuming to etch a thick coating for the waveguides. For example, one might consider 5 $\mu$m to be mid-range, ten $\mu$m to be a little thick, 20 $\mu$m to be quite thick. The amount of light spreading in the waveguide is inversely proportional to the size of the waveguide in that dimension, so a thicker coating means a deeper waveguide which means less spreading. Hence, with lenses, a thinner coating (e.g., 5 micrometers) can be used for the waveguides. Another advantage of using lenses is that the power required by the transmitters (i.e., intensity of light) can be reduced.

The lenses are generally made of plastic. The lenses can be made in several different ways. One method is to deposit droplets of resin on a substrate through a syringe apparatus which controls the characteristics and position of a droplet. This process provides high quality but is expensive. It is therefore best used for mastering. Another method involves lithographically etching, then melting and resolidifying plastic on a substrate. Traditional methods such as high quality molding and embossing are also available and less expensive. Lenses can be obtained from numerous suppliers (e.g., TR Labs of Alberta, Canada) that produce microlens arrays.

Figure 12A:
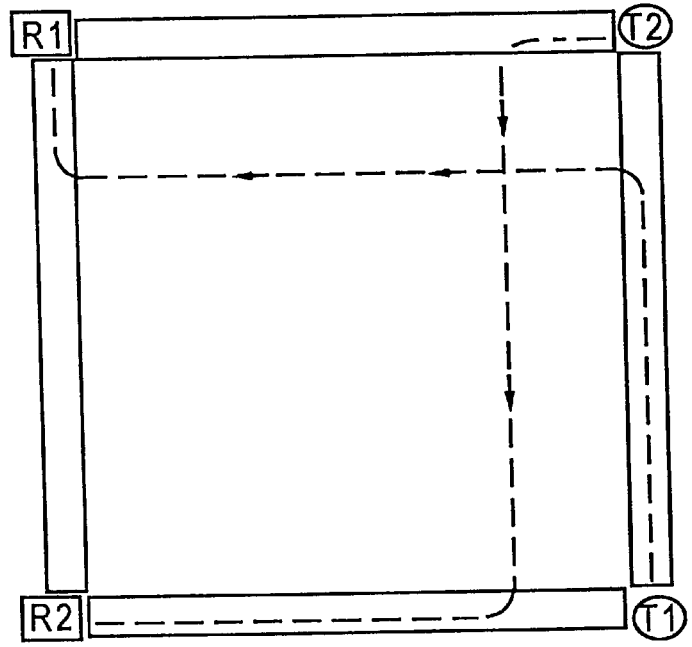
FIGS. 12A–12D are schematic diagrams of input devices according to other embodiments of the invention.
Figure 12B:
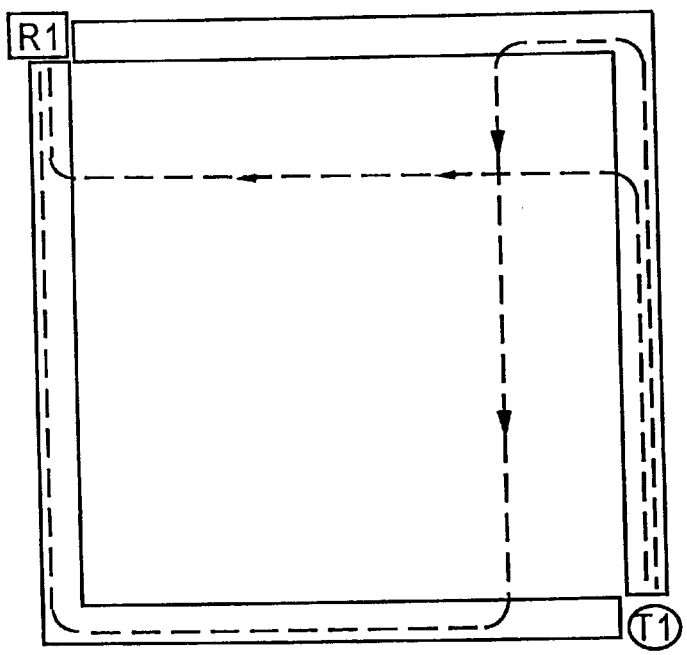
Figure 12C:
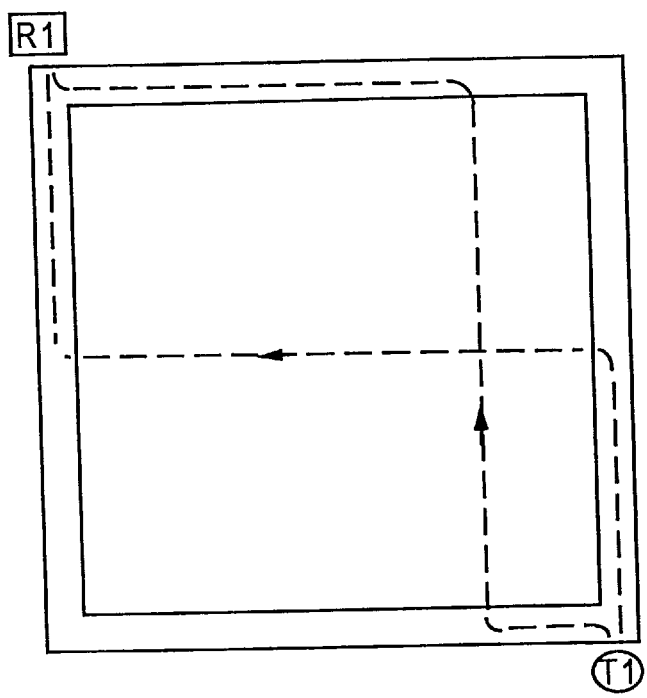
Figure 12D:
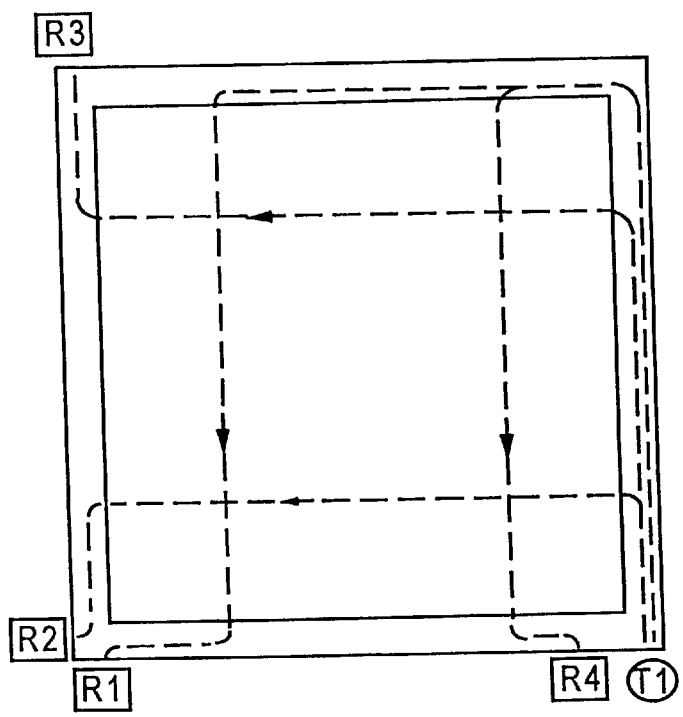

The embodiment of the input device illustrated in FIG. 4 and discussed above is possibly a preferred embodiment of the invention. However, it should be recognized that other embodiments of the invention may also be used. In these embodiments, the number of waveguides section, transmitters and receivers vary. Generally, the fewer the components the less expensive, though for larger perimeter input areas more components many be needed as fabrication of the components may also provide practical limits. FIGS. 12A–12D are schematic diagrams of input devices according to other embodiments of the invention. These embodiments depict different arrangements for the input device according to the invention in the same manner as FIG. 4. In each embodiment, the dotted lines indicate the light paths from a transmitter (light source), through the waveguides, across an input area, and into waveguides. Further, although not illustrated, these embodiments may include lenses in a manner similar to that illustrated in FIG. 4. FIG. 12A is a schematic diagram of a two transmitter (T1, T2), two receiver (R1, R2) embodiment with a waveguide structure having four sections. FIG. 12B is a schematic diagram of a one transmitter (T1), one receiver (R1) embodiment with a waveguide structure have two sections. FIG. 12C is a schematic diagram of a one transmitter (T1), one receiver (R1) embodiment with a waveguide structure having a single section. By having only a single section, alignment of opposing optical waveguide sections is avoided, though fabrication costs may be higher. FIG. 12D is a schematic diagram of a one transmitter (T1), four receiver (R1, R2, R3, R4) embodiment with a waveguide structure having a single section. With the embodiment illustrated in FIG. 12D, large input areas can be covered. Since the receivers have a limit on the number of waveguides or pixels that they can provide light detection for, the invention uses additional receivers to be able to scale to larger perimeter input devices.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. An apparatus, comprising:

a light source;

a multilayer, multichannel transmission waveguide portion optically coupled to receive light from said light source, said transmission waveguide portion integrally housing a plurality of light transmission waveguides that produce a first set of light beams by guiding the light received from said light source so that said first set of light beams emanate from said light transmission waveguides in a first direction;

a multilayer, multichannel reception waveguide portion spaced apart from said transmission waveguide in the first direction, said reception waveguide portion integrally housing a plurality of light reception waveguides for receiving said first set of light beams emanating from said light transmission waveguides; and a light detector optically coupled to said reception waveguide portion to receive the light from the light reception waveguides of said reception waveguide portion, said light detector including a plurality of light detecting elements that substantially simultaneously detects light intensity of the light from at least the first set of the light reception waveguides of said reception waveguide portion.

2. An apparatus as recited in claim 1, wherein the light reception waveguides guide the light received from associated ones of said first set of light beams emanating from said light transmission waveguides to said light detector, the guiding being from the first direction to a second direction, the second direction being different than the first direction.

3. An apparatus as recited in claim 2,
wherein said apparatus is an input device for an electronic device, and
wherein between said transmission waveguide portion and said reception waveguide portion an input area is produced.

4. An apparatus as recited in claim 3, wherein a user provides input to the electronic device by interacting with the input area.

5. An apparatus as recited in claim 3, wherein said apparatus is a user input apparatus for a computer system by interacting with the input area.

6. An apparatus as recited in claim 4, wherein the user interacts with the input area with a finger or a stylus.

7. An apparatus as recited in claim 1, wherein said light detector is an integrated circuit having a light sensing area optically coupled to said reception waveguide portion to receive the light from the light reception waveguides of said reception waveguide portion.

8. An apparatus as recited in claim 1,
wherein an input area is provided between said transmission waveguide portion and said reception waveguide portion, and
wherein said apparatus further comprises:
lenses optically positioned proximate to said transmission waveguide portion to collimate said first set of light beams emanating across the input area from the light transmission waveguides towards the corresponding light reception waveguides of said reception waveguide portion.

9. An apparatus as recited in claim 8, wherein said apparatus is an input device for providing user input to a computer system, and
wherein said light detector is an integrated circuit having a light sensing area optically coupled to said reception waveguide portion to receive the light from the light channels of said reception waveguide.

10. An apparatus as recited in claim 1, wherein the light transmission waveguides and the light reception waveguides are lithographically defined waveguides.

11. An apparatus as recited in claim 10, wherein the light transmission waveguides and the light reception waveguides have a rectangular cross-section.

12. An apparatus as recited in claim 11, wherein said transmission waveguide portion is formed of a dielectric material, and said reception waveguide is formed of a dielectric material.

13. An apparatus as recited in claim 1, wherein the light transmission waveguides redirect the light received from said light source in a substantially different direction when producing the first set of light beams.

14. An apparatus as recited in claim 13, wherein said transmission waveguide portion is formed of a dielectric material, and said reception waveguide is formed of a dielectric material.

15. An apparatus as recited in claim 1, wherein said transmission waveguide portion is formed of a dielectric material, and said reception waveguide is formed of a dielectric material.

16. An apparatus as recited in claim 1, wherein the light transmission waveguides redirect the light received from said light source in a curved fashion when producing the first set of light beams.

17. An apparatus as recited in claim 1, wherein said transmission waveguide portion has a one-piece construction that is rectangular, and said reception waveguide portion has a one-piece construction that is rectangular.

18. An apparatus as recited in claim 1, wherein said transmission waveguide portion and said reception waveguide are formed by a polymer material.

19. An apparatus as recited in claim 1, wherein said transmission waveguide portion has a one-piece construction, and said reception waveguide portion has a one-piece construction.

20. An apparatus as recited in claim 1, wherein said apparatus is a high resolution input device whereby at least said first set of light beams are able to be substantially simultaneously directed across an input area from said light source through said light transmission waveguides within said transmission waveguide portion, and then substantially simultaneously received by said light reception waveguides within said reception waveguide portion, and then being directed to the corresponding light detecting elements of said light detector where the light intensity is substantially simultaneously detected.

21. An apparatus as recited in claim 1, wherein said multilayer, multichannel reception waveguide portion includes at least one low index of refraction layer and at least one high index of refraction layer.

22. An apparatus as recited in claim 1, wherein said reception transmission waveguides have a flared out section near a side of said reception waveguide portion where said first set of light beans are received.

23. An input device for an electronic device, comprising:
at least one light source;
a light detector to detect light intensity at a plurality of light detecting elements; and
a lithographically defined multilayer waveguide structure including a plurality of waveguides,
wherein said light source couples light into a first set of the waveguides of said waveguide structure, said first set of waveguides directs the light coupling into the waveguides to produce a grid of light beams from the light coupling into the waveguides, the grid of light beams transverse an input area and are then directed to the light detecting elements of said light detector by a second set of the waveguides of said waveguide structure.

24. An input device as recited in claim 23, wherein the first set of waveguides send beams of light across the input area towards corresponding waveguides of the second set of waveguides.

25. An input device as recited in claim 24, wherein said input device further comprises:
lenses optically positioned proximate to said waveguide structure to collimate the light beams emanating from the first set of waveguides.

26. An input device as recited in claim 23, wherein said input device further comprises:
lenses optically positioned proximate to said waveguide structure to collimate the light beams emanating from the first set of waveguides.

27. An input device as recited in claim 26, wherein said lenses are micro lenses formed in a strip of material that is placed proximate to a light exit side of the first set of waveguides where the light beams emanate.

28. An input device as recited in claim 23, wherein said input device provides user input to a computer system, wherein the light couples into a first end of the waveguides, and wherein said light detector is an integrated circuit having a light sensing area optically coupled to receive the light from a second end of the waveguides.

29. An input device as recited in claim 28, wherein the light sensing area of the integrated circuit includes a plurality of photosensitive cells.

30. An input device as recited in claim 12, wherein said waveguide structure includes a plurality of sections.

31. An input device as recited in claim 30, wherein, a first of the waveguide sections produces horizontal light beams, a second of the waveguide sections produces vertical light beams, a third of the waveguide sections disposed opposite to the first of the waveguide sections across the input area receives the horizontal light beams from the first of the waveguide sections, and a fourth of the waveguide sections disposed opposite to the third of the waveguide sections across the input area receives the vertical light beams from the second of the waveguide sections.

32. An input device as recited in claim 23, wherein said waveguide structure includes at least one low index of refraction layer and at least one high index of refraction layer.

33. An input device as recited in claim 23, wherein the electronic device is a computer system having a display device, the display device includes a screen area and a peripheral portion, and wherein said input device is affixed to the peripheral portion of the display device, with the input area of said input device being placed over the screen area of the display device.

34. An apparatus as recited in claim 33, wherein the first set of waveguides redirect the light coupling into the waveguides such that the grid of light beams produced are directed in a substantially different direction than the direction in which the light coupled into the first set of waveguides.

35. An input device as recited in claim 34, wherein said input device further comprises:

lenses optically positioned proximate to said waveguide structure to collimate the light beams emanating from the first set of waveguides.

36. An input device as recited in claim 35, wherein said lithographically defined waveguide structure is a dielectric structure.

37. An input device as recited in claim 23, wherein said lithographically defined waveguide structure is a dielectric structure.

38. An input device as recited in claim 37, wherein said input device further comprises:

lenses optically positioned proximate to said waveguide structure to collimate the light beams emanating from the first set of waveguides.

39. An input device as recited in clam 37, wherein the dielectric structure is a BCB polymeric material.

40. An apparatus as recited in claim 23, wherein the first set of waveguides redirect the light coupling into the waveguides such that the grid of light beams produced are directed in a substantially different direction than the direction in which the light coupled into the first set of waveguides.

41. A method for determining a user's input with respect to a high resolution input device, said method comprising:

(a) providing a source of light;

(b) producing a plurality of parallel light beams by guiding light from the source of light through a plurality of paths housed within multichannel one-piece transmission waveguide, the multichannel one-piece transmission waveguide having a multilayer structure;

(c) simultaneously directing the parallel light beams across an input area of the input device, the input area being positioned with respect to the input device;

(d) simultaneously receiving certain of the parallel light beams after having crossed the input area;

(e) substantially concurrently determining light intensity for each of the parallel light beams received; and (f) determining whether there is a user's input with respect to the input area based on the determining light intensity values.

42. A method as recited in claim 41, wherein said method determines a position of the user's input with respect to the input device, and wherein said method further comprises:

(g) determining a position of the user's input with respect to the input device based on the determined light intensity values.

43. A method as recited in claim 41, wherein said producing (b) of the parallel light beams includes guiding light from the source of light through a plurality of curved paths of the multichannel one-piece transmission waveguide.

* * * * *